United States Patent
Chapman

(10) Patent No.: US 8,733,478 B2
(45) Date of Patent: May 27, 2014

(54) CAMERA CRANE MOBILE BASE

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 203 days.

(21) Appl. No.: 13/402,070

(22) Filed: Feb. 22, 2012

(65) Prior Publication Data

US 2012/0152630 A1 Jun. 21, 2012

Related U.S. Application Data

(63) Continuation-in-part of application No. 13/308,880, filed on Dec. 1, 2011, now Pat. No. 8,322,858, which is a continuation-in-part of application No. 12/846,711, filed on Jul. 29, 2010, now Pat. No. 8,550,632.

(51) Int. Cl.
*B62D 61/10* (2006.01)
*B60K 7/00* (2006.01)
*B60G 3/10* (2006.01)
*B60G 11/08* (2006.01)

(52) U.S. Cl.
USPC .... 180/24.07; 180/60; 180/65.51; 180/24.08; 280/124.171

(58) Field of Classification Search
CPC .. B60G 11/08; B60G 2202/114; B60G 5/025; B60G 5/03; B60G 5/043; B60G 5/047; B60G 2200/144; B62D 61/10; B60K 7/0007; F16M 11/42; F16M 11/28; B66F 11/048; G03B 17/561
USPC .............. 180/15, 16, 24.06, 24.07, 60, 24.08, 180/65.51; 280/124.171
See application file for complete search history.

(56) References Cited

U.S. PATENT DOCUMENTS

| | | | | |
|---|---|---|---|---|
| 1,576,920 | A | * | 3/1926 | Lundelius ........................ 267/52 |
| 1,794,145 | A | * | 2/1931 | Bussien ......................... 180/257 |
| 2,501,796 | A | * | 3/1950 | Tucker ................... 280/124.137 |
| 3,426,862 | A | * | 2/1969 | Wilfert ........................... 180/362 |
| 4,702,843 | A | * | 10/1987 | Oswald et al. ............. 280/5.507 |
| 4,747,424 | A | | 5/1988 | Chapman |
| 4,952,953 | A | | 8/1990 | Ridderstolpe |
| 5,312,121 | A | | 5/1994 | Chapman |

(Continued)

OTHER PUBLICATIONS

United States Patent and Trademark Office, non-final Office Action mailed Sep. 17, 2012 in U.S. Appl. No. 12/846,711.

(Continued)

*Primary Examiner* — Ruth Ilan
(74) *Attorney, Agent, or Firm* — Kenneth H. Ohriner; Perkins Coie LLP

(57) ABSTRACT

A mobile base for a camera crane includes a front left drive motor assembly, a front right drive motor assembly, a rear left drive motor assembly, and a rear right drive motor assembly, attached to a chassis. Each drive motor assembly may include an electric motor linked to an axle via a gear reduction and at least one wheel on the axle. A middle left drive motor assembly and a middle right drive motor assembly may each also include an electric motor linked to an axle via a gear reduction, at least one wheel on the axle, and a spring suspension assembly attached to the chassis and supporting the axle. An electrical power supply on the chassis may be linked to each of the electric motors.

12 Claims, 23 Drawing Sheets

(56) References Cited

U.S. PATENT DOCUMENTS

| | | |
|---|---|---|
| 5,490,684 A | 2/1996 | Chapman |
| D378,156 S | 2/1997 | Chapman |
| D379,017 S | 4/1997 | Chapman |
| 5,620,192 A | 4/1997 | Demongin |
| 5,704,623 A | 1/1998 | Chapman |
| 6,056,450 A | 5/2000 | Walling |
| 6,626,117 B1 | 9/2003 | Chapman |
| 6,719,307 B1 | 4/2004 | Chapman |
| 7,111,574 B2 | 9/2006 | Slatter |
| 7,134,517 B1 | 11/2006 | Kaiser et al. |
| 7,303,033 B2 | 12/2007 | Chernoff |
| 7,311,452 B2 | 12/2007 | Chapman |
| 7,464,775 B2 * | 12/2008 | Clemens et al. ............... 180/8.3 |
| 7,588,104 B2 | 9/2009 | Ohashi et al. |
| 7,926,833 B2 | 4/2011 | Hellbusch |
| 8,322,858 B2 | 12/2012 | Chapman |
| 2003/0076480 A1 | 4/2003 | Burbulla |
| 2006/0012144 A1 | 1/2006 | Kunzler |
| 2006/0046826 A1 * | 3/2006 | Gilmartin ....................... 463/19 |
| 2006/0278459 A1 | 12/2006 | Iwaki et al. |
| 2007/0080001 A1 * | 4/2007 | Beck et al. ................. 180/24.07 |
| 2010/0116572 A1 * | 5/2010 | Schmitt et al. ............. 180/65.51 |

OTHER PUBLICATIONS

United States Patent and Trademark Office, Final Office Action mailed Apr. 5, 2013 in U.S. Appl. No. 12/846,711.
United States Patent and Trademark Office, International Search Report and Written Opinion for PCT/US11/45250, Dec. 21, 2011.
International Search Report and Written Opinion for PCT Publication No. WO05/085948 dated Aug. 11, 2005.
Chapman/Leonard Studio Equipment, Inc. 2008-2010 catalog, pp. 84, 86, 88, 90-97.
Hand-out for Apollo Mobile Crane by Chapman.
Chapman/Leonard Studio Equipment, Inc. Jun. 2005 catalog, pp. 10-11, 16-17, and 96-97.

* cited by examiner

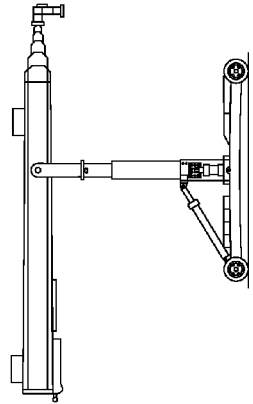
FIG. 21
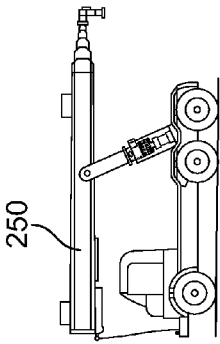
FIG. 24
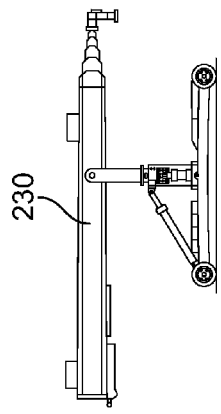
FIG. 20
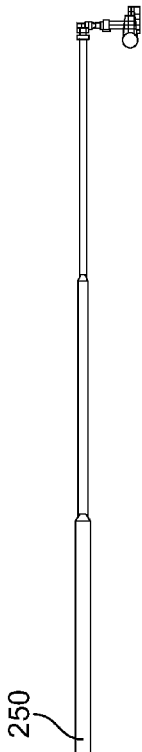
FIG. 22
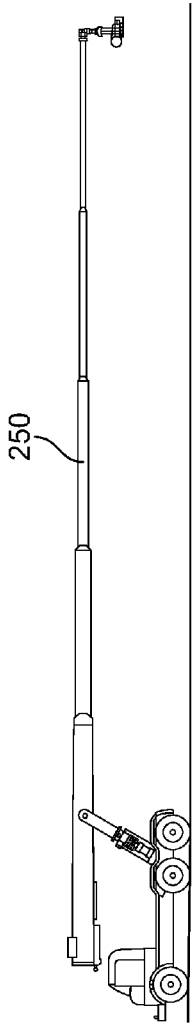
FIG. 23
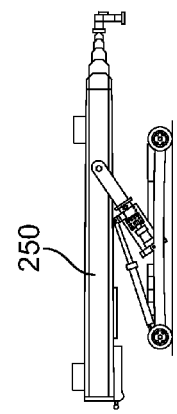
FIG. 19
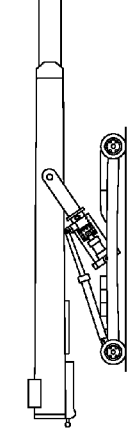

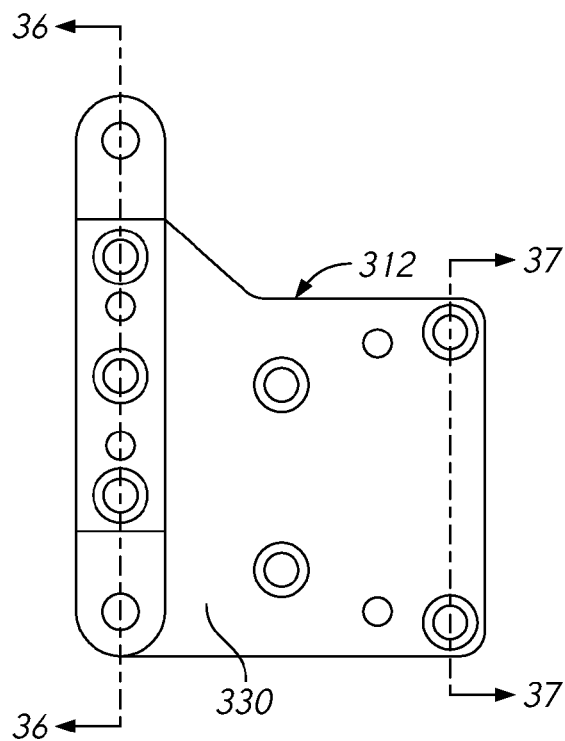
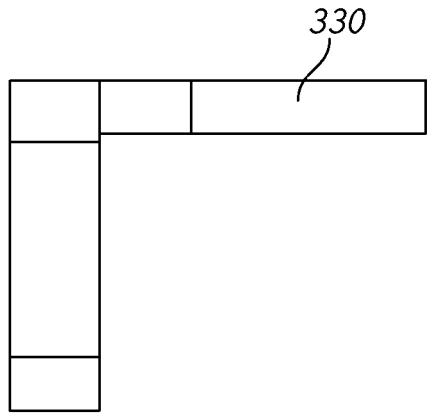
FIG. 35
FIG. 34
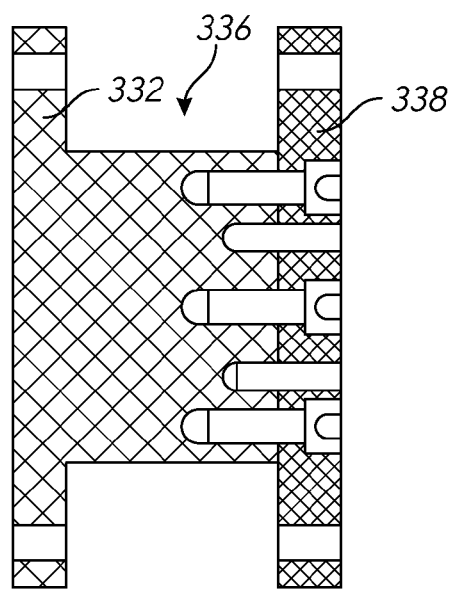
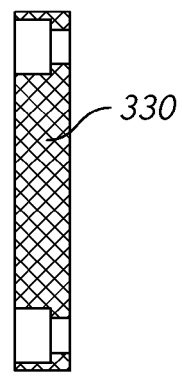
FIG. 37
FIG. 36

CAMERA CRANE MOBILE BASE

This application is a Continuation-in-Part of U.S. application Ser. No. 13/308,880 filed Dec. 1, 2011 and now pending, which is a Continuation-in-Part of U.S. application Ser. No. 12/846,711 filed Jul. 29, 2010, and now pending. These applications are incorporated herein by reference.

BACKGROUND OF THE INVENTION

Camera cranes are used to position and maneuver motion picture cameras, such as motion picture film or digital cameras, HD cameras, and 2D and 3D cameras. Camera cranes typically have a crane arm mounted onto a mobile base or vehicle. The arm can be pivoted or tilted up or down, and panned from side to side, to obtain a desired camera position, while the mobile base remains stationary. Some crane arms can extend and retract with a telescoping movement. To follow a moving subject during filming, or to move the camera around a subject, move in, back-up or move diagonally in any direction, the motion base is pushed over the ground by the filming crew, or the motion base may be self-propelled via an on-board motor.

As filming often takes place on location outside of a studio, the mobile base is advantageously capable of carrying heavy payloads over soft or uneven ground surfaces, such as grass, sand, soil, or over slippery surfaces such as snow. While existing motion bases have performed well, there is a need for motion bases having still further traction and stability.

SUMMARY OF THE INVENTION

A new mobile base for a camera crane has now been invented providing greater traction, motive power and stability. In one aspect, this new mobile base includes a front left drive motor assembly, a front right drive motor assembly, a rear left drive motor assembly, and a rear right drive motor assembly, attached to a chassis. Each drive motor assembly may include an electric motor linked to an axle via a gear reduction and at least one wheel on the axle. A middle left drive motor assembly and a middle right drive motor assembly may each also include an electric motor linked to an axle via a gear reduction, at least one wheel on the axle, and a spring suspension assembly attached to the chassis and supporting the axle. An electrical power supply on the chassis may be linked to each of the electric motors.

In another aspect, the middle left and/or right drive motor assemblies may be provided as accessories that can be attached to the mobil base and used on an as-needed basis, to provide increased driving power, traction, and/or stability.

In yet another aspect, the left and/or right drive motor assembly may include an inner plate or link attachable to a chassis of a camera crane mobile base. An upper spring and a lower spring each have a first end rigidly attached to the inner link, and an outer end pivotally attached to an outer plate or link, with the inner and outer links and the upper and lower springs forming a parallelogram.

Other and objects and features will become apparent from the following detailed description of the drawings. This description is provided as an example of how the invention may be made and used, and is not intended to specify the scope of the invention. The invention resides as well in the methods described, and in sub-combinations of the elements and steps described.

BRIEF DESCRIPTION OF THE DRAWINGS

In the drawings, the same element number indicates the same element in each of the views.

FIG. 19 is a reduced side of the mobile base as shown in FIG. 2 with the column in the full down position and tilted fully over (about 60 degrees from vertical), and with a telescoping crane arm on the column and in a fully retracted position.

FIG. 20 is a reduced side view of the mobile base as shown in FIG. 1 with the column in the full down position and vertical, and with a telescoping crane arm on the column and in a fully retracted position.

FIG. 21 is a reduced side view of the mobile base as shown in FIG. 3 with the column in the full up position and vertical and with a telescoping crane arm on the column and in a fully retracted position.

FIG. 22 is a reduced side of the mobile base as shown in FIG. 2 with the column in the full down position and tilted fully over (about 60 degrees from vertical), and with a telescoping crane arm on the column fully extended.

FIG. 23 is a reduced side of alternative over-the-road mobile base as with the column in the full down position and tilted rearward about 30 degrees from vertical, and with a telescoping crane arm on the column fully extended.

FIG. 24 is a reduced side view of the mobile base shown in FIG. 23 with the column tilted forwardly by about 30 degrees, into a transport/storage position.

FIG. 34 is a side view of the motor plate shown in FIGS. 29-33.

FIG. 35 is a top view of the motor plate.

FIG. 36 is a section view taken along line 36-36 of FIG. 34.

FIG. 37 is a section view taken along line 37-37 of FIG. 34.

DETAILED DESCRIPTION OF THE DRAWINGS

Figure 2:
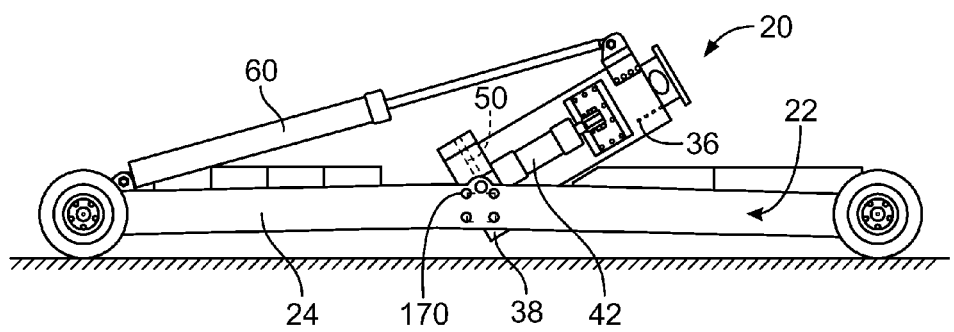
FIG. 2 is a side view now showing the column fully tilted over to a low position.
Figure 3:
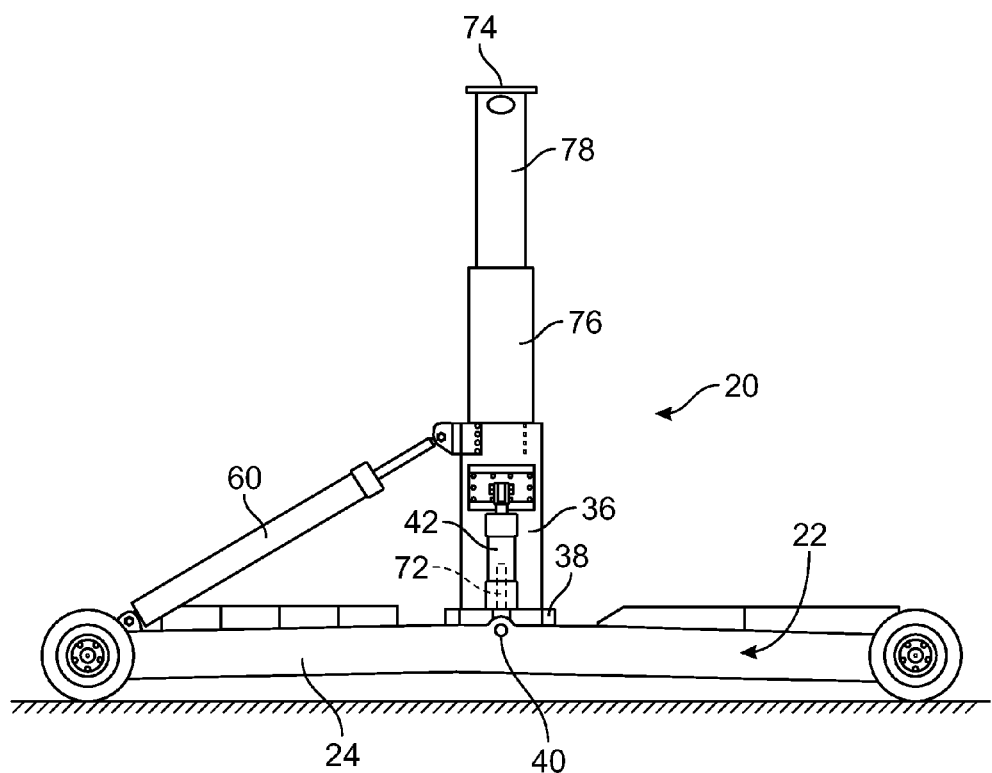
FIG. 3 is a side view showing the column upright, as in FIG. 1, but now with the column telescopically extended up.
Figure 4:
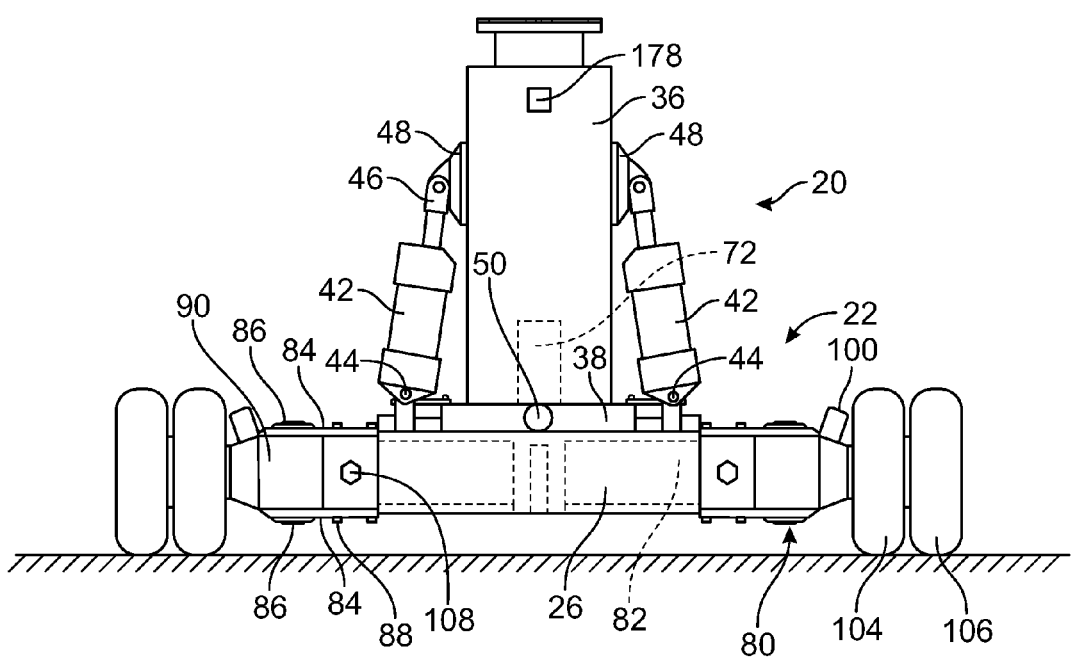
FIG. 4 is a back end view of the mobile base shown in FIG. 1, with various elements omitted for purpose of illustration.

Turning now in detail to the drawings, as shown in FIGS. 1-4 and 6, a new mobile base 20 has a chassis 22. A column 36 is pivotally attached to a column frame 38 via a longitudinal axle 50 shown in FIG. 4. The column frame 38 is in turn pivotally supported onto the chassis 20 via a lateral axle 40. The axles 50 and 40 may extend through or below the lower end of the column 36, or each axle may be provided as two separate axle stubs. With the column pivotally supported by the axles 50 and 40, the column can tilt to the left or right side, and front to back. Referring to FIG. 4, the lower ends or cylinders of left and right side lateral actuators 42 are attached to the chassis 22 on opposite sides of the column 36 via lateral pivot joints 44. The upper end or piston of each of the lateral actuators 42 is attached to a lateral clevis 46 on a side plate 48 of the column 36.

Figure 1:
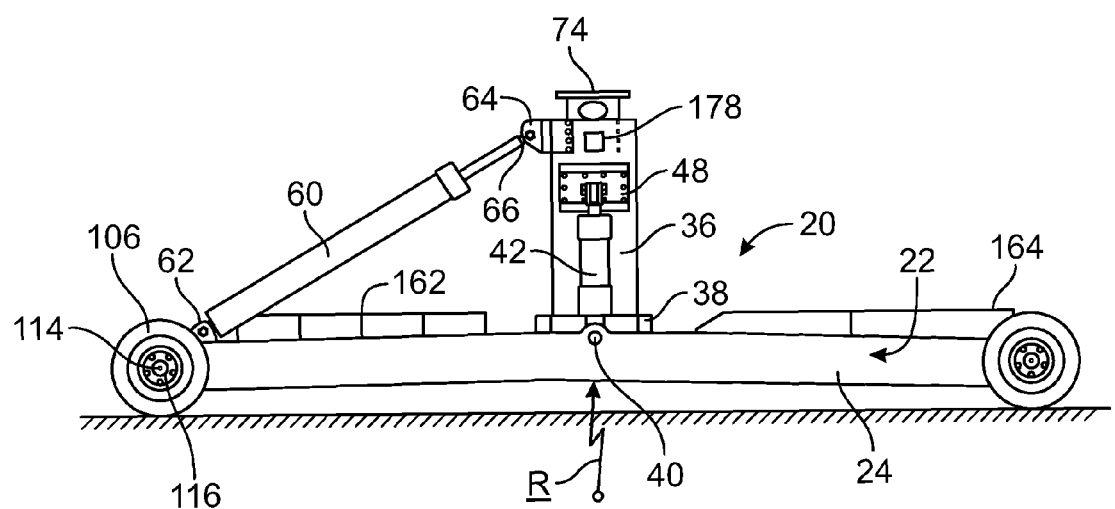
FIG. 1 is a side view of my new camera crane mobile base design, with the column upright.
Figure 6:
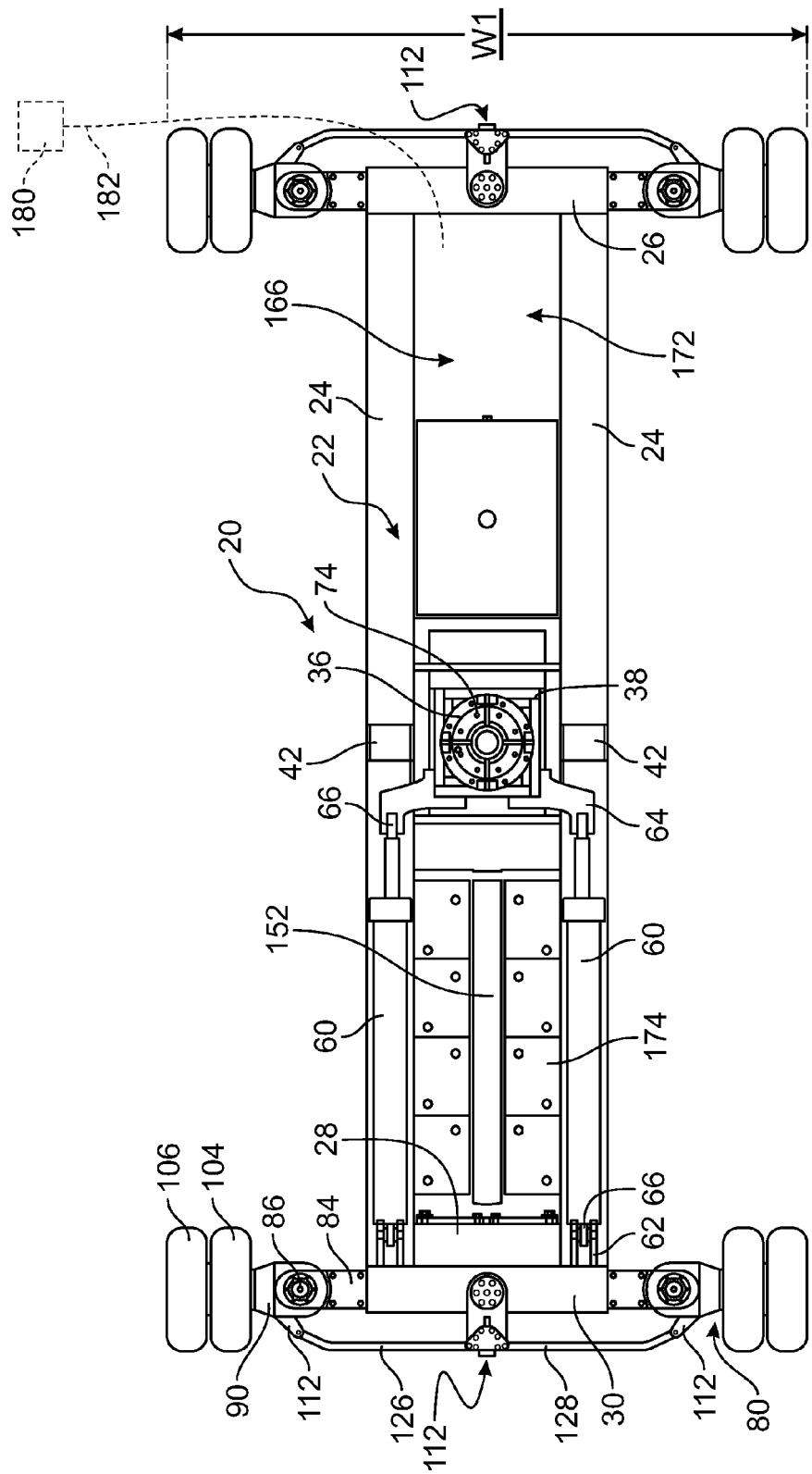
FIG. 6 is a plan view of the mobile base shown in FIG. 1.

As shown in FIGS. 1 and 6, longitudinal actuators 60 are similarly attached to the chassis 22 and the column 36. Specifically, the lower end or cylinder of each longitudinal actuator 60 includes a ball or swivel fitting 66 attached to a front clevis 62 on the chassis 22. The upper end or piston of each longitudinal actuator 60 includes a ball or swivel fitting 66 attached to a column clevis 64. Control of the actuators 42 and 60 accordingly can pivot or tilt the column 36 along two perpendicular axes. The ball or swivel fittings 66 allow the actuators to move with the column without binding. FIG. 1 shows the column 36 in a vertical upright position, with the actuators at nominal starting positions. FIG. 2 shows the longitudinal actuators 60 nearly fully extended. In this position, the column 36 is tilted over towards the back of the mobile base 20, to reduce the overall height of the mobile base 20.

The column 36 may have a fixed length, or it may have a variable length provided using telescoping sections. FIGS. 1, 2 and 4 show a telescoping column 36 in a retracted position. An actuator 72 within the column 36 provides extending, holding, and retracting forces for the telescoping column, if used. FIG. 3 shows the column 36 extended, with column sections 76 and 78 extended and visible. A payload platform 74 at the top end of the column 36 has a hole pattern and/or other elements for attaching a crane arm onto the column 36. For example, a crane arm as described in U.S. Pat. No. 7,311,452, incorporated herein by reference, may be used.

Figure 10:
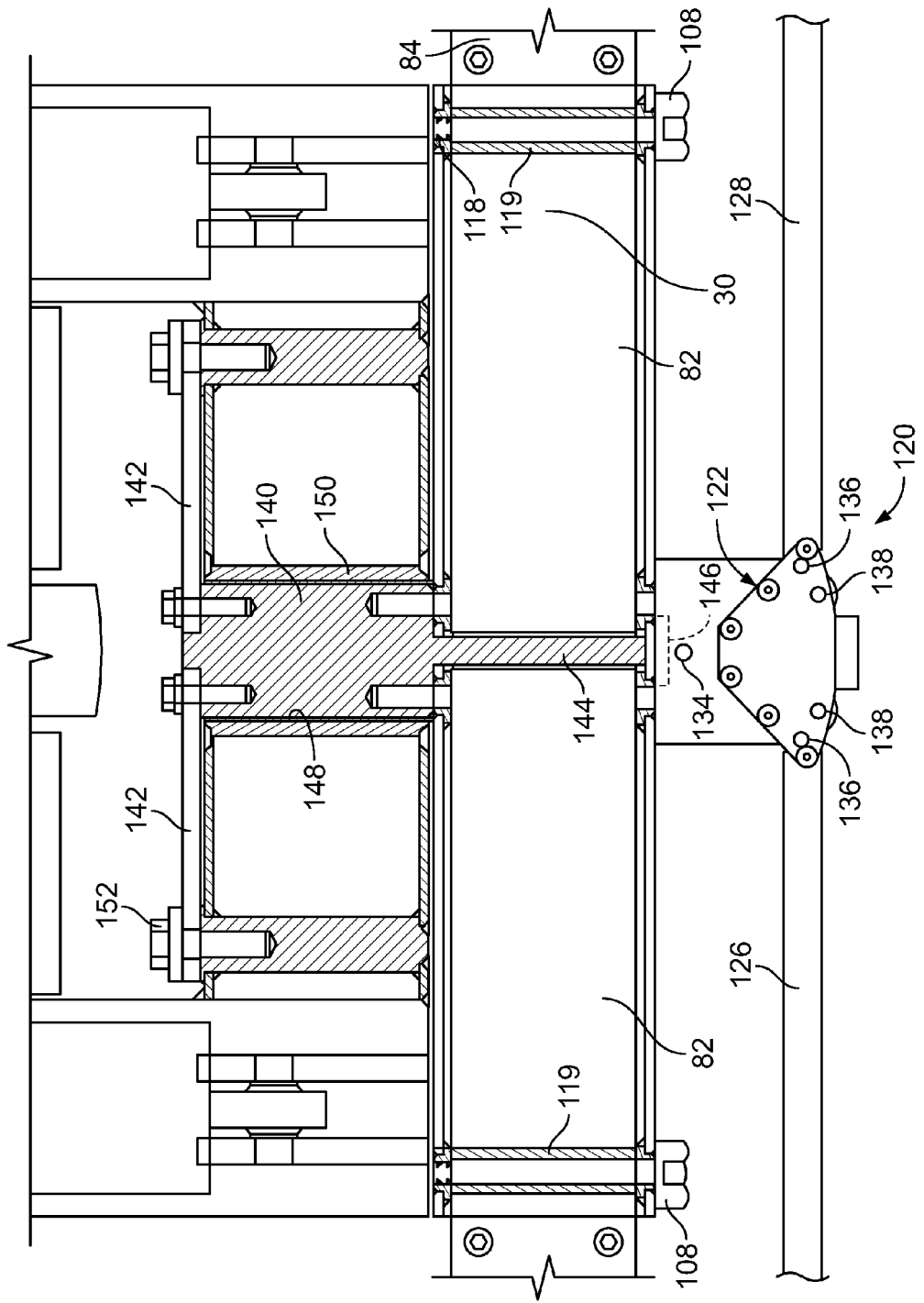
FIG. 10 is a top view, in part section, showing elements of a steering system and a rocker suspension.

As shown in FIGS. 4 and 6, a drive motor assembly 80 is provided at each of the corners of the chassis 22. The four drive motor assemblies shown in FIG. 6 may be the same. As shown in FIG. 4, a structural fitting 82 is provided at the inner end of the drive motor assembly 80. The fitting 82 is adapted to fit into or onto the chassis 22. In the specific example shown, the fitting 82 is a tube sized and shaped to slide, with nominal clearance, into the open outer end of the back end tube 26, the front end tube 28 or the rocker tube 30, if used. As shown in FIG. 10, a motor housing clamping bolt 108 may extend through a standoff 119 inside of the tubes 26 and 30 and thread into a rear nut 118. Tightening the clamping bolt securely clamps and holds the drive motor assembly 80 in place. The standoff 119 avoids crushing the tubes 26 and 30 via over tightening. The fitting 82 may be slotted so that it can pass over the standoff 119.

Figure 7:
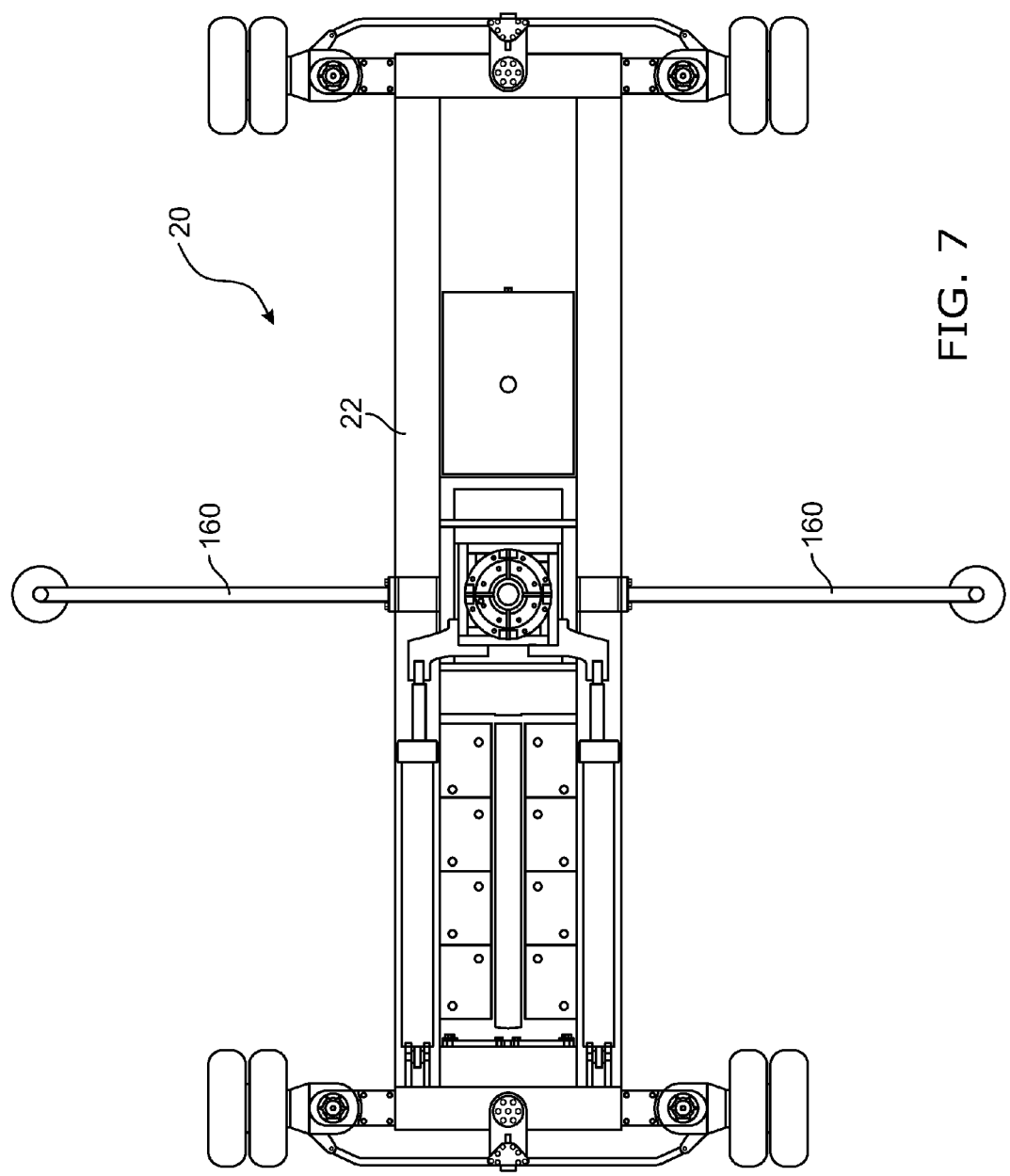
FIG. 7 is another plan view of the mobile base shown in FIG. 1 with outriggers attached.
Figure 8:
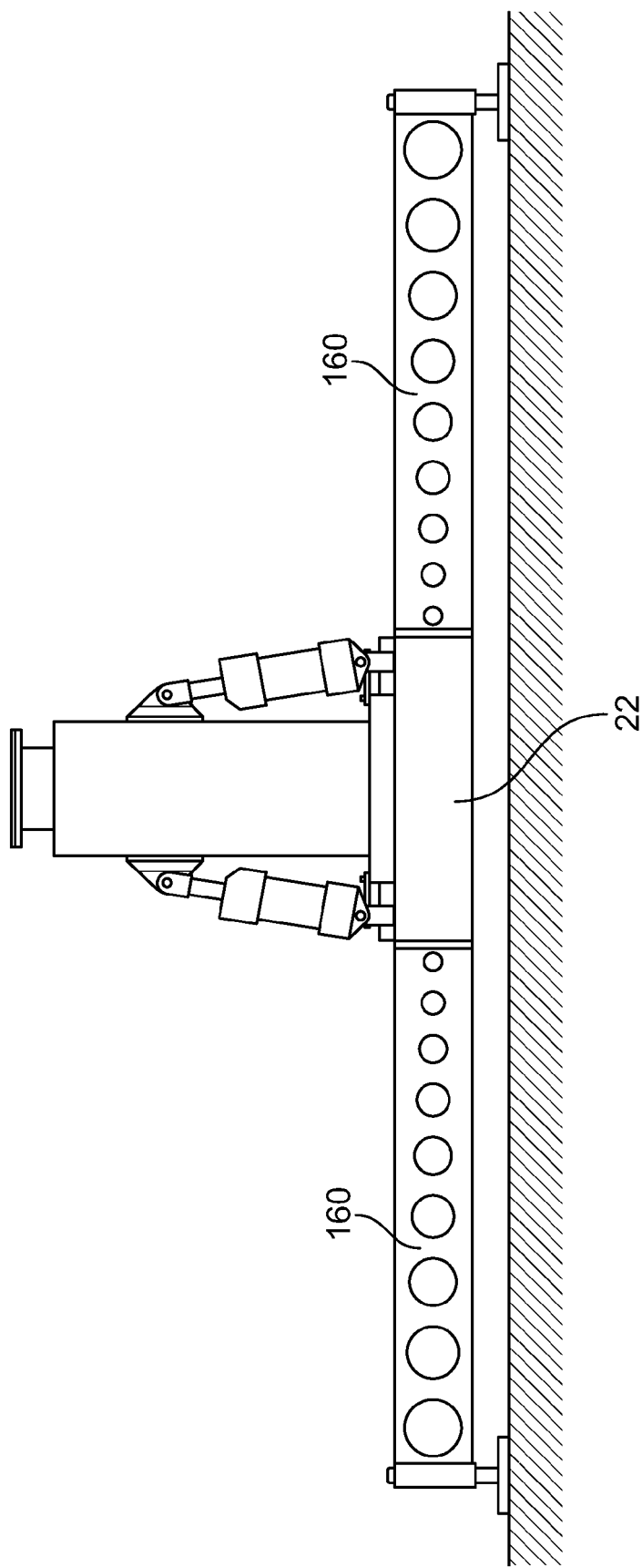
FIG. 8 is a back end view of the mobile base shown in FIG. 7, with various elements omitted for purpose of illustration.
Figure 9:
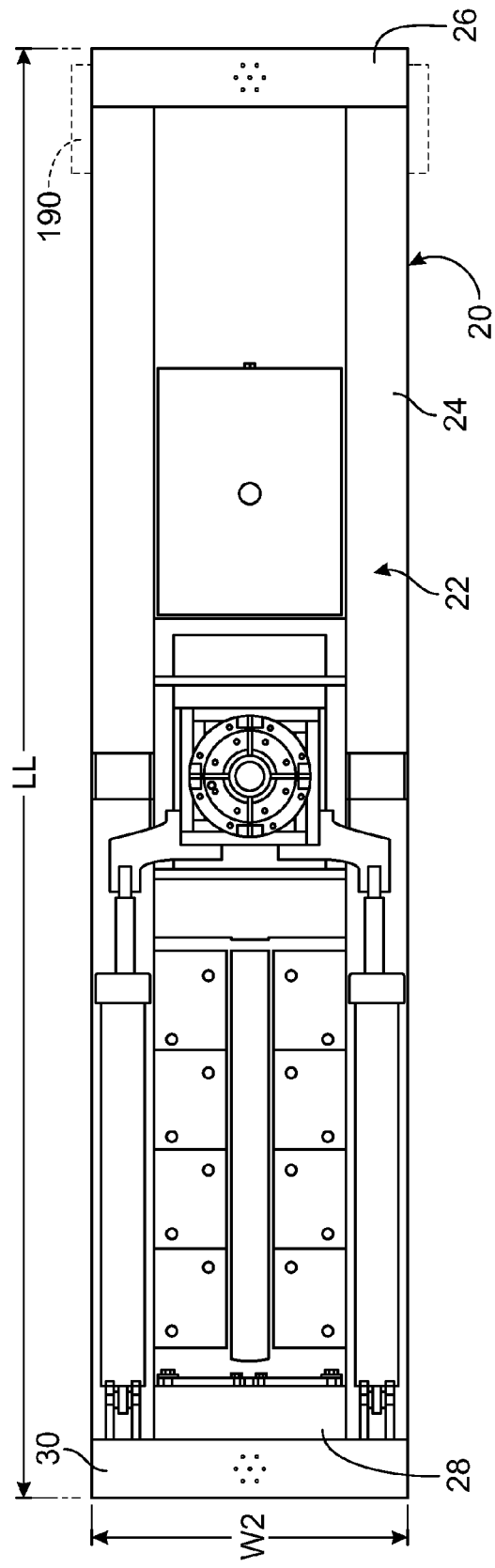
FIG. 9 is a plan view of the mobile base as shown in FIG. 6, but with the drive motor assemblies removed.

As shown in FIG. 6, with the drive motor assemblies 80 installed, the mobile base 20 has a relatively large width W1 to make the mobile base stable. In the example shown, W1 may be about 180 to 250 cm (70-96 inches). As shown in FIG. 9, with the drive motor assemblies 80 removed, the width W2 of the mobile base 20 is greatly reduced down to about 75 to 100 cm (30-40 inches). In the example shown in the drawings, W2 is about 80 cm, allowing the mobile base to fit through most standard doorways. For additional stability, outriggers 160 may be attached to the chassis 22, as shown in FIGS. 7 and 8. The outriggers 160 may be attached to the chassis 22 using a pattern of bolt holes 170 provided on each side of the chassis, as shown in FIG. 2.

Figure 5A:
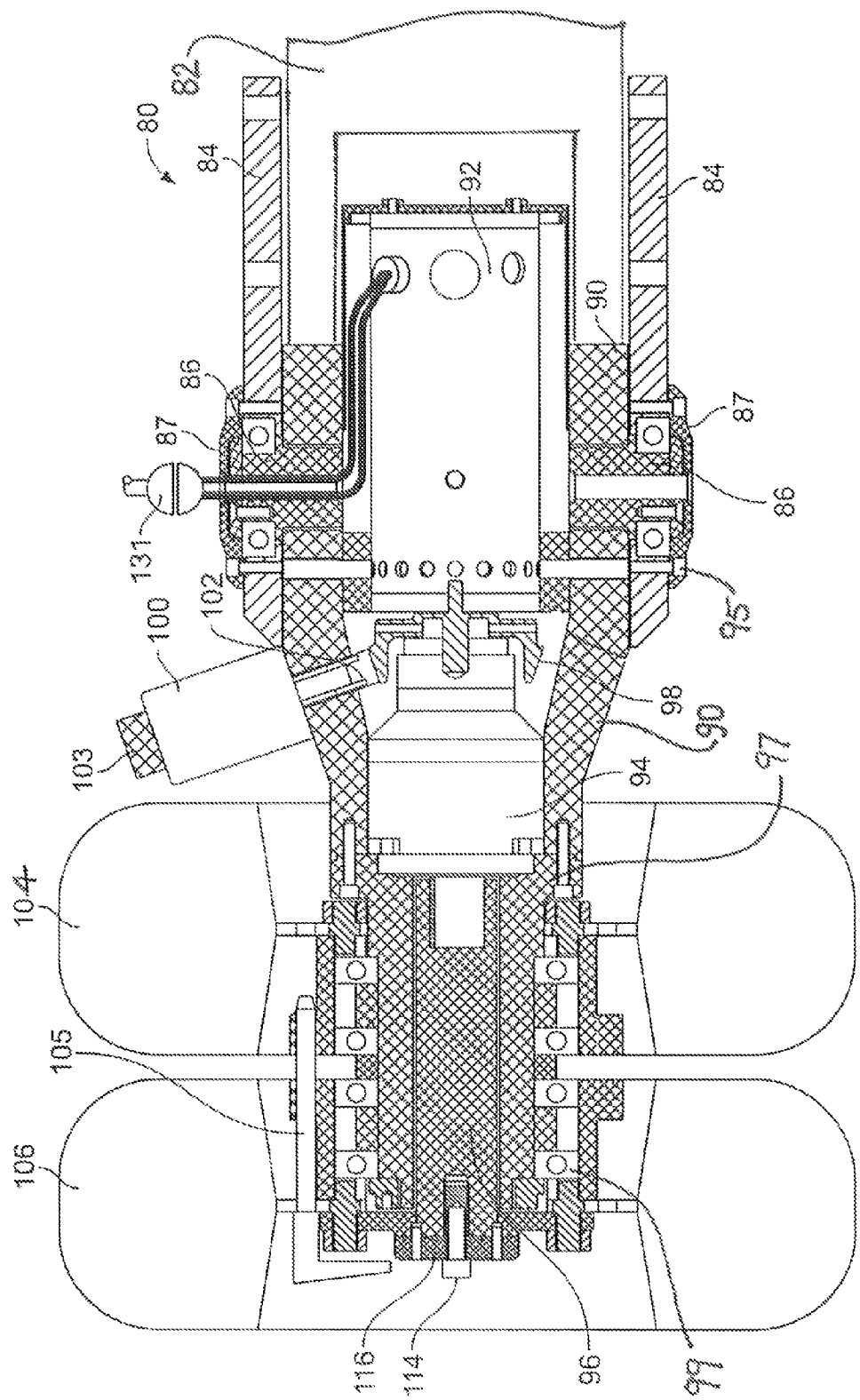
FIG. 5A is an enlarged view of the right side drive motor assembly shown in FIG. 4.

Turning to FIG. 5A, top and bottom vertical axle plates 84 are attached, e.g., using bolts 88, onto the fitting 82. Vertical axle stubs 86 on motor housing 90 are pivotally attached to the vertical axle plates 84 via stub caps 87. An axle 96 extends through an axle housing 97 attached to the motor housing 90. An electric motor 92 within the motor housing 90 drives the axle 96 through reduction gearing 94. Inner and outer wheels 104 and 106 are secured onto the axle housing 97 on bearings 99. Motor bolts 95 hold the motor 92 in place within the motor housing 90, and prevent the motor 92 from rotating within the housing.

With a design capable of carrying a payload of up to 4550 kg (10000 lbs), an electric motor rated at about 0.4 KW (0.5 HP) may be used. Since the mobile base 20 is generally operated at walking speed, the planetary gearing system 94 has a high ratio, for example 100:1. The torque exerted by each drive wheel assembly 80 is therefore high, for example translating into about 700 pounds force, for a total of up to about 1270 kg force (2800 pounds) of motive force available to propel the mobile base. The mobile base 20 can accordingly propel itself up a steep incline.

Figure 5B:
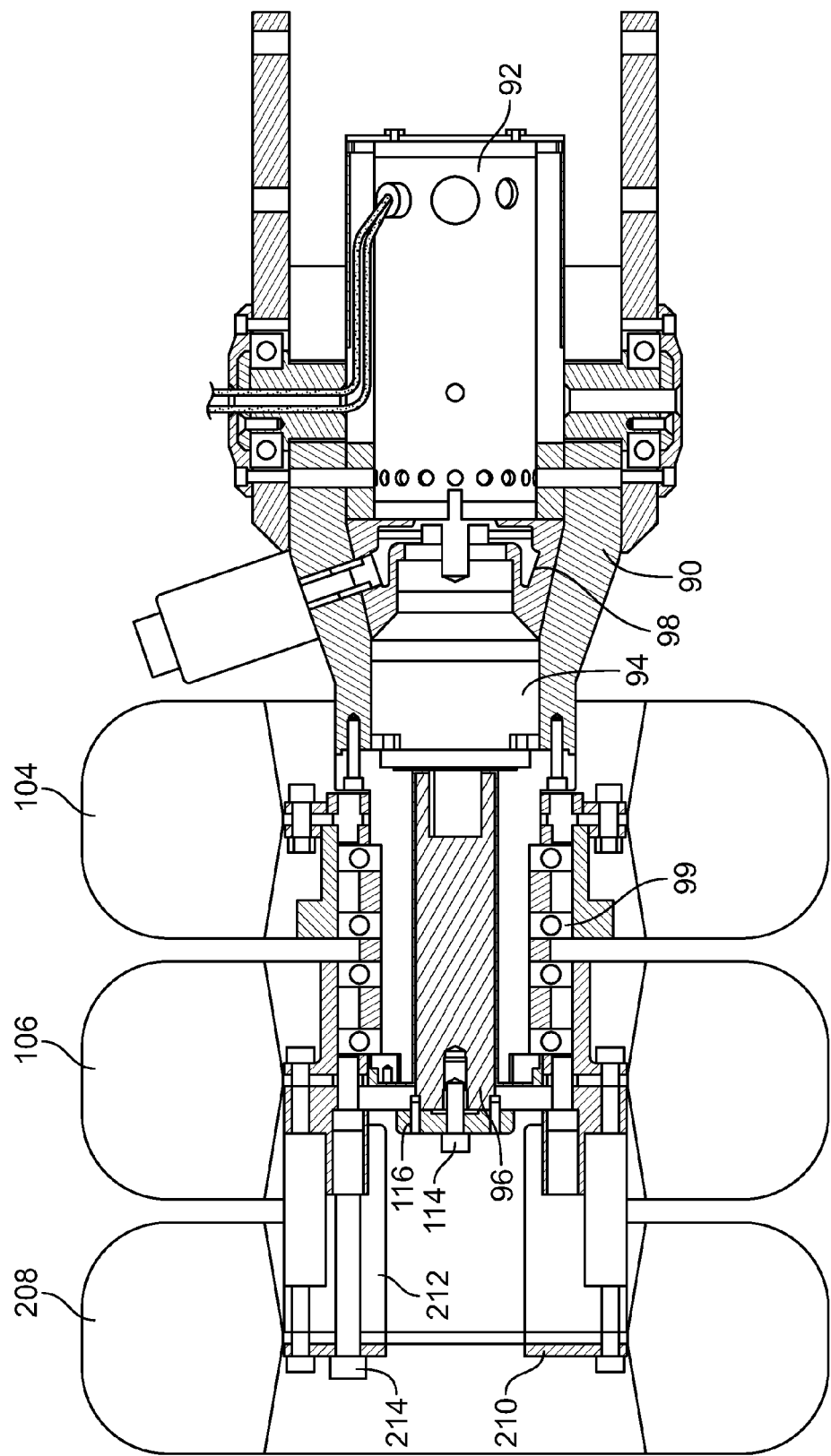
FIG. 5B is an enlarged view of the assembly shown in FIG. 5A modified to include a third wheel.

FIG. 5B shows an alternative design which is similar to the design in FIG. 5A except that a third tire 208 is added, optionally as a bolt-on accessory. The third tire 208 is mounted on a third rim or wheel 210. A wheel extension 212 is bolted onto the wheel 210. In use, the wheel extension 212 is bolted onto the second or middle wheel using bolts 214. Adding the third tire onto each drive motor assembly 80 provides a wider wheel base and greater stability. Rolling ground pressure is also reduced. In FIG. 5B, the third tire 208 is shown as an add-on accessory. However, mobile base 20 may also be provided with three tires permanently attached on each drive motor assembly 80, using a design similar to FIG. 5A, and with extending the axle 96, drive pins 105, and tire inflation tubes (where pneumatic tires are used).

Referring still to FIG. 5A, a brake system may be provided on each motor housing 90. In one example, the brake system includes an electric brake solenoid 100 including a brake pad 102 on an armature. A spring urges the brake pad 102 away from a brake rotor 98 attached to the motor shaft. The solenoid 100 pushes the brake pad 102 against the brake rotor 98 when electric current is provided to the solenoid. When electric current is turned off, spring forces the brake pad 102 back away from the brake rotor 98, to apply release braking force. Turning a release knob 103 on the solenoid can mechanically and manually hold the armature against from the brake rotor 98. This allows the brake on each motor housing to be released or disengaged without electrical power.

Alternatively, the spring can urge the brake pad against the brake rotor 98, and the solenoid can be continuously provided with electrical current to hold the brake pad away from the brake rotor, unless electrical current is interrupted. In this design, the brake is normally on, unless it is electrically turned off via current to the solenoid. Since the braking force is multiplied through the gearing system 94, even a nominal braking force applied to the brake rotor 98 can quickly stop rolling movement of the mobile base 20 and hold the mobile base against movement on a steep incline.

Turning momentarily to FIG. 4, the chassis 22 may be formed as a steel weldment including side tubes 24 joined to a back end tube 26 and a front end tube 28. A rocker tube 30 may be pivotally attached to the front end tube, as shown in FIGS. 9 and 10 and further described below. As shown in FIG. 1, the side tubes 24 may have a curvature, such as a radius of curvature R. When loaded with a payload crane arm, which may weigh several tons, the curvature avoids sagging at the center of the chassis and provides greater ground clearance at the center of chassis. The tubes 24, 26, 28 and 30 typically have a rectangular or square cross section, although other shapes may be used. Alternatives to tubes, such as I-beams, C-sections, etc. may also be used. Although tubes 26 and 28 are referred to here as back end and front end tubes, respectively, either end of the mobile base may be considered to be a front end or a back end. The steering and performance characteristics of the mobile base 20 may be the same with movement in either direction.

The steering system 120 provides multiple steering modes. These include conventional front corrective steering. In this mode, the rear wheels are locked in the straight ahead position, and the front wheels have corrective steering, where the inner wheel is turned to a sharper angle than the outer wheel, when the base makes a turn. This mode is similar to steering in an automobile, but with more precise geometry. Conventional rear corrective steering is also provided, and is similar to conventional front corrective steering, except that the front wheels are locked straight ahead and the rear wheels have corrective steering. Crab is a third mode of steering, where the wheels at all four corners of the mobile base are all steered at the same angle simultaneously. Round steering is a fourth mode of steering where the wheels are aligned on the same diameter, to allow mobile base to rotate about its center. Straight steering mode is a fifth mode where all wheels are locked in a straight ahead position. A discussion of the geometry of steering modes is provided in U.S. Pat. No. 5,704,623, incorporated herein by reference.

Figure 11:
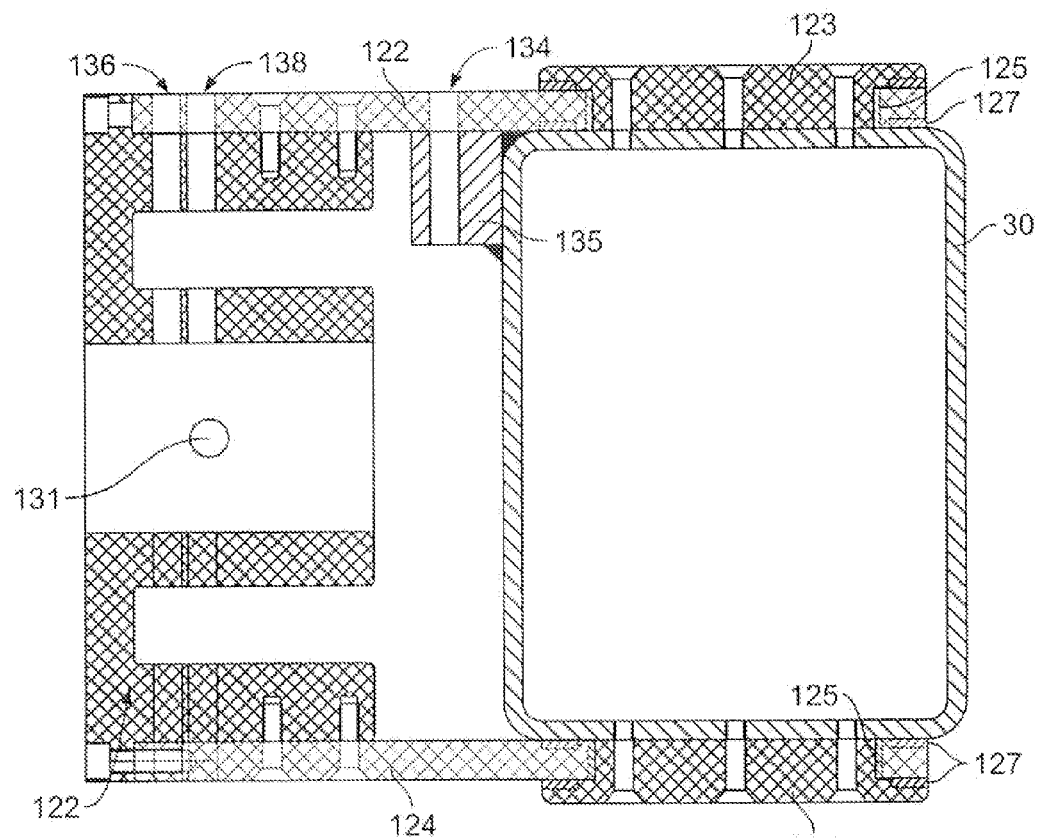
FIG. 11 is partial section view of the steering system elements shown in FIG. 10.
Figure 12:
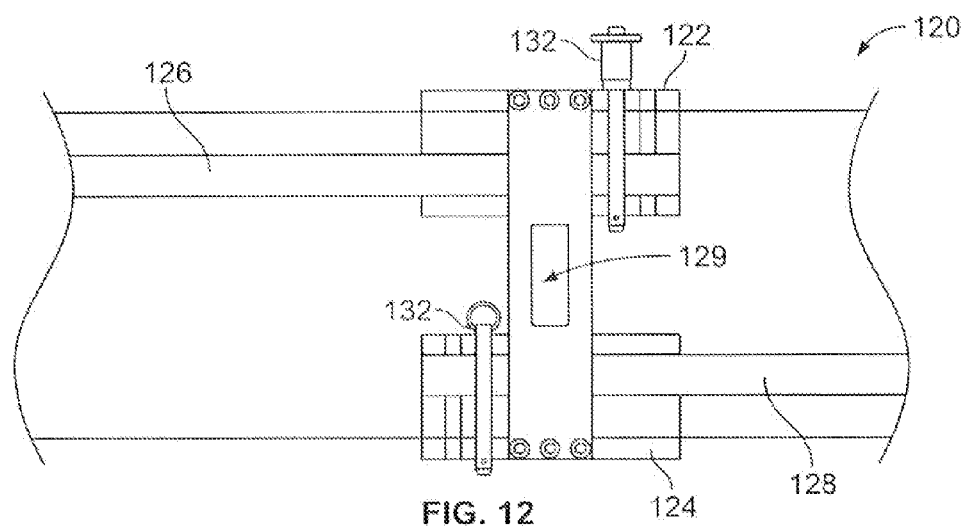
FIG. 12 is a front view of the steering system shown in FIGS. 10 and 11.
Figure 13:
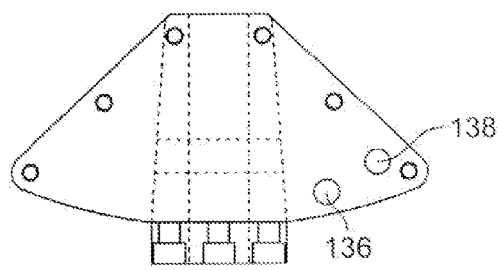
FIG. 13 is a top view of the steering link frame shown in FIGS. 11 and 12.

As shown in FIGS. 6, 10-17, a steering system 120 may be provided at the front and/or back ends of the mobile base 20. The steering system 120 shown includes upper and lower steering compensator plates 122 and 124 having a set of conventional steering mode holes 136 and a set of round steering mode holes 138. The plates 122 are pivotally attached to the rocker tube 30 or the back end tube 26 by plate caps 123 and bushings 125 and 127, as shown in FIG. 11. The outer ends of upper and lower steering bars 126 and 128 are pivotally attached to steering arms 112 on left and right side motor housings 90, as shown in FIG. 6. The inner ends of the bars 126 and 128 are pinned in place into the holes 136 or 138 in the plates 122 and 124 which extend into a steering frame 122 between the plates 122 and 124 (depending on the steering mode selected) using quick release pins 132.

With the bars pinned to the holes 136, the steering system is in a corrective conventional mode. This configuration is also used for crab steering mode. With the steering bars pinned to the holes 138, the steering system is in round steering mode. To place either the front or rear steering system 120 into the straight ahead steering mode, a pin is placed into the straight ahead lock out hole 134 and extends into the lock out block 135 fixed onto the chassis, as shown in FIG. 11. This locks the plates of the steering system in place relative to the chassis 22, fixing the wheels into the straight ahead position. This steering system design 120 may be used for the front wheels, or for the back wheels, or for both the front and back wheels.

Figure 14:
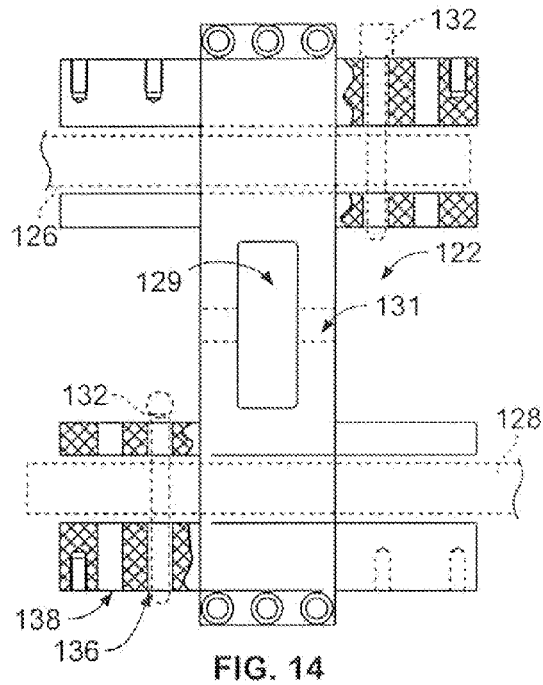
FIG. 14 is a front view of the link frame shown in FIG. 13.
Figure 16:
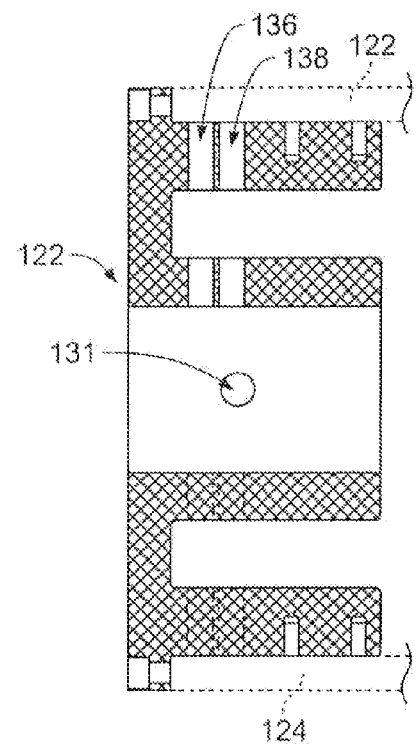
FIG. 16 is a side view of the steering link frame shown in FIG. 14.
Figure 15:
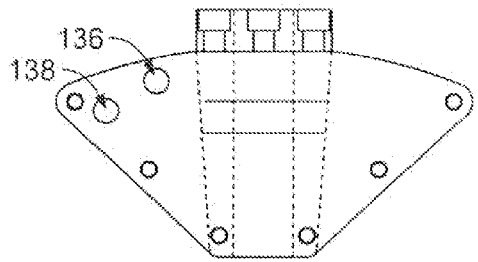
FIG. 15 is a bottom view of the steering link frame shown in FIGS. 11 and 12.
Figure 17:
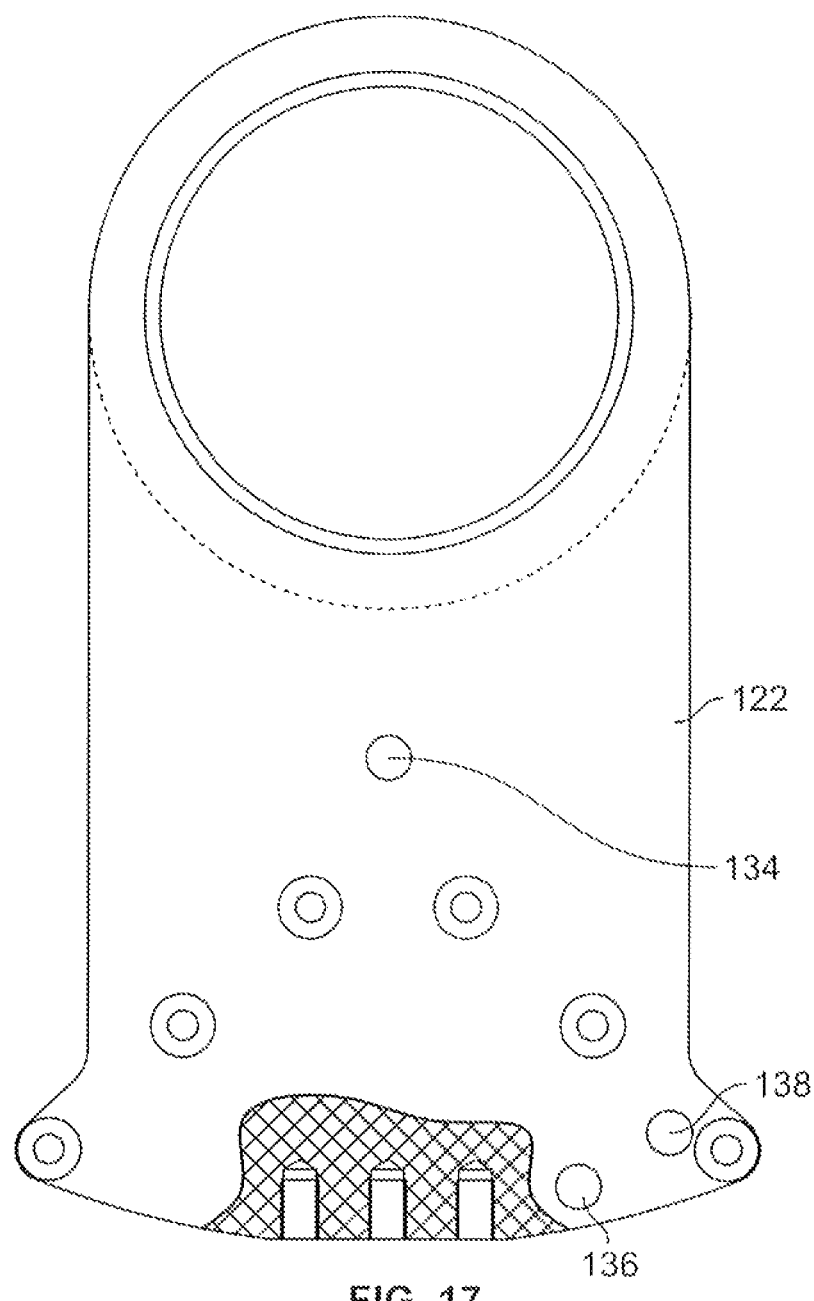
FIG. 17 is a top view of the upper plate shown in FIGS. 11 and 12.

The steering system 120 can be used manually by attaching a steering handle to the compensator plates, with members of the filming crew pulling on the handle to roll the mobile base while also using the handle for steering. The back end of the handle can be inserted through a tow bar opening 129 in the steering frame 122, and locked in place via a pin inserted into a steering bar lock hole 131 in the steering frame 122, as shown in FIGS. 14 and 16. Additional filming crew members may push the mobile base, optionally using a second steering handle attached to compensator plates at the back end of the mobile base. With a gross weight of up to about 4500 kg (10,000 lbs), manually pushing the mobile base 20 typically requires 7-10 crew. On the other hand, using the drive motor assemblies 80 to move the mobile base requires only a single operator, saving time and human labor.

Referring to FIG. 5A, when the mobile base is moved manually, the outer wheels are first released from the axle 96 by backing out a wheel release bolt 114. This moves a pin plate 116 outwardly to allow the outer wheel 106 to rotate freely on the axle 96. Freeing the wheels to rotate on the axle avoids trying to back drive the gearing 94 and the motors 92. With the wheels free to rotate on the axle, rather than with the axle, the mobile base may pushed manually; or towed at higher speeds with a tow vehicle.

The inner wheel 104 typically is attached to the axle 96 on a bearing and is not locked to the axle. However, the inner wheel 104 may be linked to the axle by pushing a two wheel drive pin 105 into a hole in the hub or rim of the inner wheel 104. This locks the inner wheel 104 to the outer wheel 106, which in turn in linked to the axle 96 via the pin plate 116. Consequently, both the inner and outer wheels are then both driven by the motor 92.

The steering system 120 mechanically forces the left and right side wheels into steering angles that track precisely with the path of movement, to avoid wheel scrubbing, skidding, and rolling friction. Precise wheel tracking is achieved regardless of the power provided to the motors 92, because the relative steering angles of the inner wheels and the outer wheels is set by the steering system. Using a control system having steering angle sensors, wheel speed sensors, and an appropriate computer and feedback control system, in some designs, the steering bar links 126 and 128 may be removed, with steering then performed only by varying the relative speeds of the motors 92.

As shown in FIG. 10, a rocker tube 30 may be pivotally attached to a front end tube 28 of the chassis 22. In this design, the rocker tube 30 may be attached onto a rocker axle 140 having a rocker plate 144 extending centrally into the rocker tube 30. The rocker plate 144 provides a mechanical stop inside the rocker tube 30 for the inserts or fittings 82 of the drive motor assemblies 80. A bushing 148 is provided in between a cylindrical shaft section of the rocker axle 140 and a shaft section housing 150.

Referring still to FIG. 10, the inner ends of rocker axle plates 142 are bolted onto the back end of the rocker axle 140. Lock out bolts 152 extend through curved slots in the outer ends of the rocker axle plates 142. With the lock out bolts 152 released, the rocker axle 140 and the rocker tube 30 can pivot relative to the chassis 22. With the lock out bolts 152 tightened, the rocker axle 140 and the rocker tube 30 are rigidly joined to the chassis and cannot pivot. This can add stability when the mobile base 20 is stationery and providing a fixed base. With the lock out bolts 152 released, the rocker axle allows the mobile base 20 to simulate a three-point suspension, with all wheels at all four corners of the chassis in contact with the ground, even where the ground is uneven. Pivoting movement of the rocker tube 30 is limited by the ends of the slots in the rocker axle plates 142 coming into contact with the lock out bolts 152. The nuts 118 towards the outer ends of the rocker tube 30 may be located in slots cut into the front end plates of the side tubes 24, to also provide hard stops limiting pivoting movement of the rocker tube 30.

Referring to FIG. 6, the actuators 42, 60 and 72 may be hydraulic actuators. The mobile base 20 may include an on-board hydraulic system 172 connected via hydraulic lines to these actuators. The hydraulic system 172 typically includes one or more hydraulic oil storage tanks, pumps, valves, accumulators, etc. The mobile base 20 may also include an electrical system 166 including multiple batteries 174 to provide an on-board power source for powering the motors 92, as well as electrical components in the hydraulic system 172, such as an electric motor driving a hydraulic pump. The electrical system may also include various electrical components such as switches, controls, indicators, etc. The hydraulic and electrical system components are located on or in the deck of the chassis, and may be covered by front and rear deck covers 162 and 164.

As shown in FIG. 6, a control box 180 is connected to the electrical system 166 by a cable. The control box typically includes a computer controller. The control box may include a first joystick controlling the front motors 92 and a second joystick controlling the rear motors 92. Deflecting the joystick to the front or to the rear drives both the left and right side motors in the corresponding direction. Deflecting the joystick to either side causes the left and right side motors to rotate at different speeds, causing the controlled set of wheels to turn to the left or to the right, with the steering angle of each wheel mechanically controlled via the geometry of the steering system.

In use, a crane arm is attached to the payload platform 74. Various types of fixed length, segmented, or telescoping crane arms may be used. The payload on the camera platform may include various types of cameras and camera equipment, with or without a human camera operator also on the camera platform. The column 36 may be automatically leveled via a feedback loop including attitude sensors 178 on the column and corrective movements applied by the actuators 42 and 60 via the controller 180. Optionally, the column may be tilted via the actuators into a non-vertical position to achieve a desired camera position or movement. In general, the person operating the mobile base 20 can walk behind the mobile base, with the control box held onto the operator using a belt or harness. This leaves both hands of the operator free to operate the joysticks and/or other controls and switches on the control box. The drive motor assemblies 80 and the electrical system 166 may be typically designed so that the mobile base has a top speed of 1.6 to 5 km/hour (1-3 mph), i.e., a relatively slow walking speed.

Figure 26:
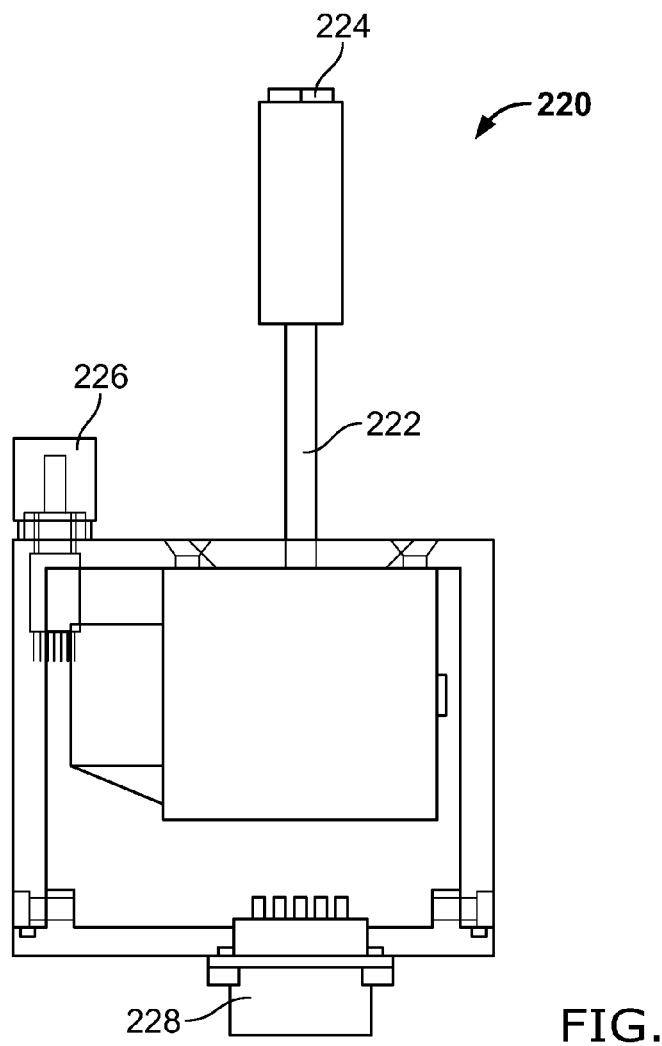
FIG. 26 is a section view of a hand held joystick controller that may be used to drive and/or steer the mobile base.
Figure 27:
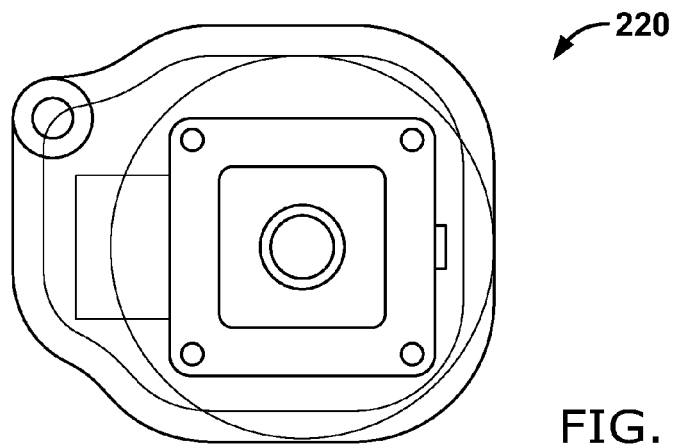
FIG. 27 is a top vie of the controller shown in FIG. 26.

FIGS. 26 and 27 show an alternative controller 220 using a single joystick 222 that can control all of the drive motors. The controller 220 can be hand held. Pushing the joystick in any direction from the neutral center position causes the mobile base 20 to move in that direction. The controller 220 controls electrical current to the drive motors that both propels and steers the mobile base. Steering is achieved by applying more electrical current to the motor on one side. A switch 226 on the controller 220 is switched into a selected steering mode. The steering linkages are correspondingly set into the selected steering mode. The controller 220 then applies corresponding amounts of electrical current to each of the motors, depending on the position of the joystick 222, the steering mode selected, and the position of the motor (i.e, front, back, left, right, corner). The controller 220 may be electrically connected to the electrical system, including the batteries and drive motors, via a cable attached to a connector 228, or via a wireless link. A momentary button 224 on the joystick may be used to apply the brakes.

Especially for sound stage use, where the floor is even and uniform, the steering systems 120 may be engaged, and the rocker tube 30 locked out, for smooth and quiet movement. For use on rougher surfaces, such as on outdoor pavement, roadways, grass, sand, etc., use of the steering systems 120 may or may not be used, and the rocker tube 30 may be unlocked to provide greater stability over uneven ground.

To move the base 20 through a relatively narrow opening, such as a doorway, the actuators 60 can be fully extended. This tilts the column far over rearward, so that height or the mobile base 20 is reduced. The drive motor assemblies 80 may also be removed from the chassis, to reduce the width of the chassis and allow it to fit through a typical doorway. The drive motor assemblies 80 can be removed by jacking up the front end of the chassis. The release bolts 108 shown in FIG. 4 are loosened or removed. The steering bars 126 and 128 are removed by releasing the quick release pins 132. The electrical cable connecting into the motor housing of each drive motor assembly is detached via a connector pair 131. The two front drive motor assemblies 80 are then pulled out sideways to withdraw the fitting 82 from the end of the tube. The front end of the chassis is then jacked down onto a set of caster wheels 190, shown in FIG. 9. The rear motors 92 may then be energized to push the chassis through the doorway. The front drive motor assemblies are re-installed and the same procedure is then performed at the back end of the chassis. The front motors 92 can then be energized to pull the chassis forward and entirely through the doorway. The rear drive motor assemblies are then reinstalled. The chassis may alternatively simply be pushed, with sufficient force applied, instead of separately using the front and rear motors 90 to move the chassis.

Figure 18:
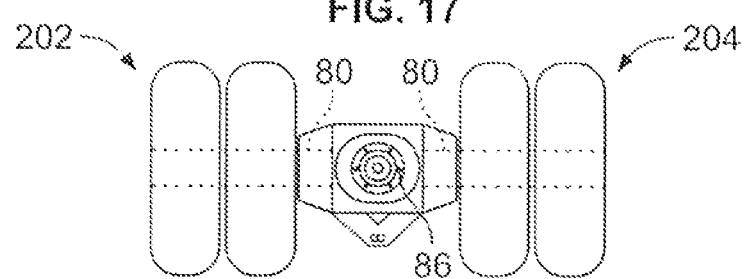
FIG. 18 is a plan view of an alternative drive wheel assembly arrangement.

Referring to FIG. 5A, as the motor 92 drives the axle 96, a reaction force exerts a turning moment about the vertical axis passing centrally through the vertical axle stubs 86, even when the mobile base 20 is driven straight ahead. The steering bars 126 and 128 exert an opposite moment. In an alternative design as shown in FIG. 18, a pair of drive motor assemblies 80 are located on opposite sides of the axle stubs 86. In this design, the turning moment about the axle stubs is avoided, although the steering geometry of the inner and outer wheel sets 202 and 204 is less precise. The chassis 22 must also be raised or modified to provide clearance for the inner set of wheels.

FIG. 19 shows the mobile base with the column tilted over about 60 degrees from vertical, and with a telescoping crane arm 250 attached to the column. In this setup, the camera at the end of the crane arm may be positioned vertically above the ground at eye height. Using a drop down head or under slung riser, the camera may be positioned even closer to the ground. The telescoping arm can then be extended or retracted, as shown in FIG. 22, with the camera at the desired vertical position, to follow a filmed sequence, such as actors walking on a street. Since the camera movement in this setup is purely horizontal, dynamically maintaining the desired lens position can be easily achieved. In contrast, with prior art camera cranes, to achieve a similar shot, the arm must be positioned at a downward angle, because the column supporting the arm is above the desired vertical position. In addition, with the column tilted over, the crane arm is low enough so that crane operators can reach all parts of the crane arm, without a ladder, to change counterweights or take other action.

The reduction of overall height of the mobile base achieved by tilting the column is shown by comparison of FIGS. 20 and 21 with FIG. 19. In FIG. 21, with the column in the full up position, the top of the vertical column is about 275 cm above the ground, in the example shown. In FIG. 20, with the column in the fully down position, the top of the vertical column is about 136 cm above the ground. In FIG. 19, with the column tilted to about 60 degrees, the overall vertical height of the mobile base (at the top of the fitting 64) is about 105 cm.

FIGS. 23 and 24 show an alternative base provided in the form of an over the road vehicle. FIG. 23 shows an extended telescoping crane arm on the mobile base. FIG. 24 shows the crane arm retracted and the column tilted forward for transport or storage. The cab of the vehicle may be removable, to provide additional clearance for arm movement, and to provide the drive with a better view of the arm.

The crane arm 250 typically includes a mechanical linkage or a motorized system attached to the camera platform to keep the platform level, as the elevation angle of the arm changes. Motorized systems make also act to keep the camera platform level by compensating for other changes as well. In some systems, the camera platform leveling system measures the angle between the column, such as the column 36, and the arm 250.

Figure 25:
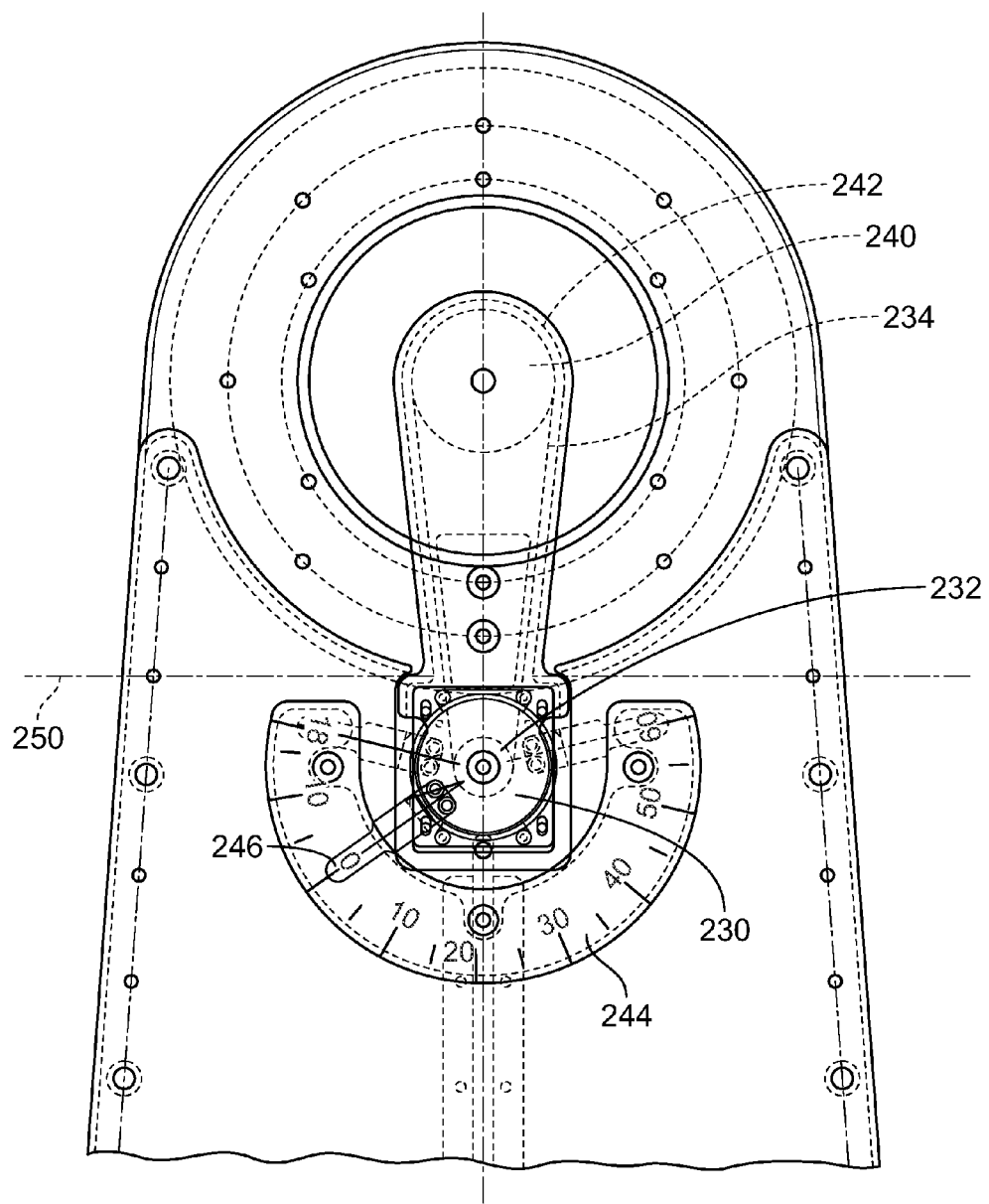
FIG. 25 is side view of column angle compensating system.

FIG. 25 shows a modification of this type of system which compensates for the any tilt in the column. In FIG. 25, an arm gear 242 is attached to an arm axle 240 attached to the arm 250. As the arm 250 tilts up or down, a belt 234 passing around the arm gear 242 drives a smaller gear 232 in a potentiometer or position sensor 230. The electrical output of the position sensor 230 consequently indicates the angle of elevation of the arm 250.

However, if the column is tilted, the indicated angle of elevation is changed. To compensate, the crane operator measures the column tilt angle, for example by reading a gravity operated angle indicator on the column. The operator then moves a compensator arm 246 attached to the position sensor 230 to the matching angle on an angle scale 244. The position sensor 230 can then indicate the correct angular position of the arm 250, and the camera platform leveling system can maintain proper leveling of the camera platform.

Figure 28:
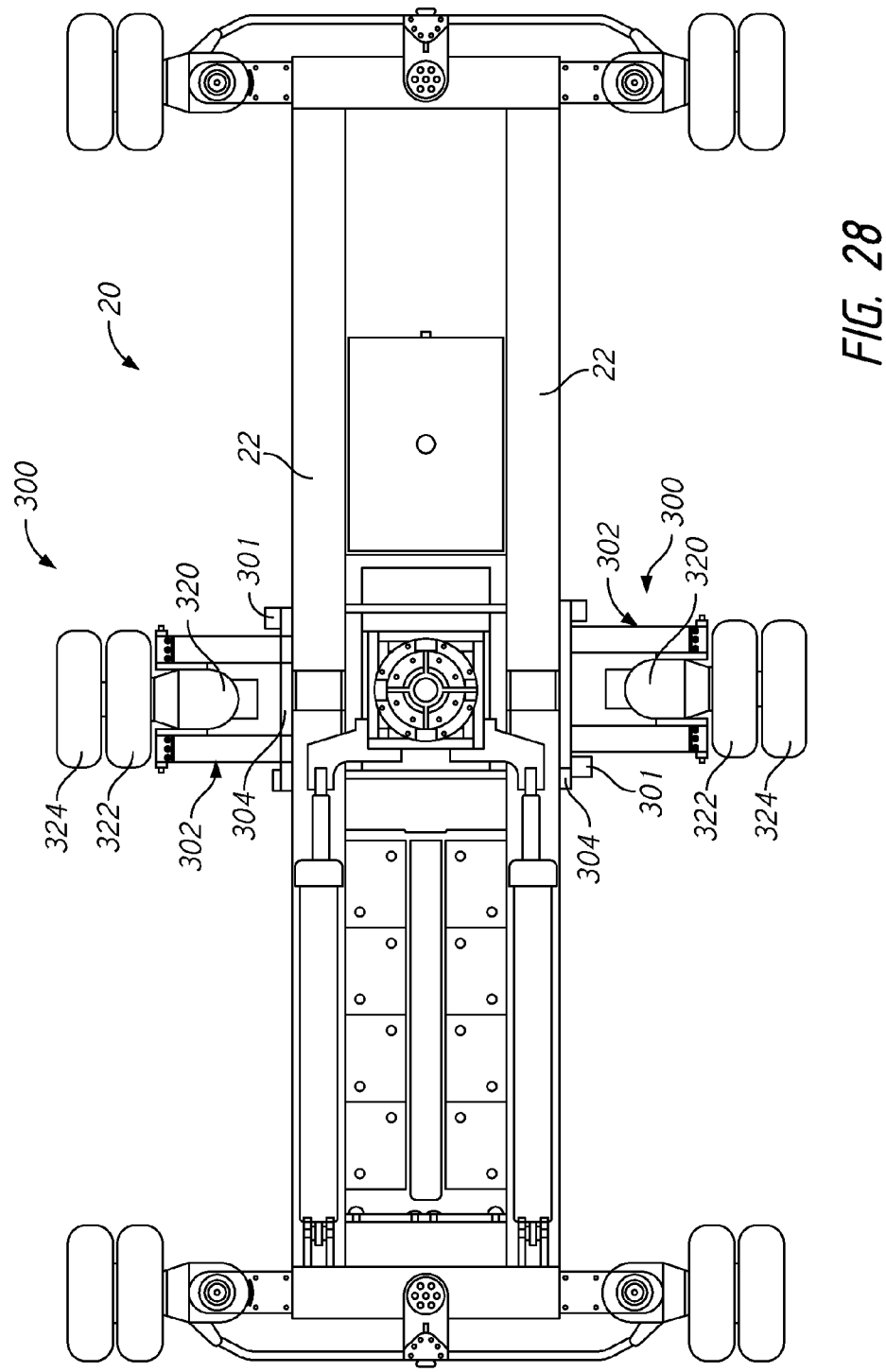
FIG. 28 is a top view of an alternative mobile base with accessory driving wheel units attached.

Turning now to FIG. 28, the mobile base 20 may be equipped with left and right side driving wheel accessory units 300, to provide added traction and mobility. The wheel units 300 may be attached to the chassis 22 using bolts 301 threaded into the holes 170 shown in FIG. 2. The holes 170 may be the same holes used to attach the outriggers shown in FIG. 7. The wheel units 300 may be located at the midpoint of the chassis 22. The left and right side wheel units 300 shown in FIG. 28 may be identical, with either unit installed on either side of the chassis 22. Accordingly, the description below is directed to the left side wheel unit, with the understanding that the description applies as well to the right side wheel unit.

Figure 29:
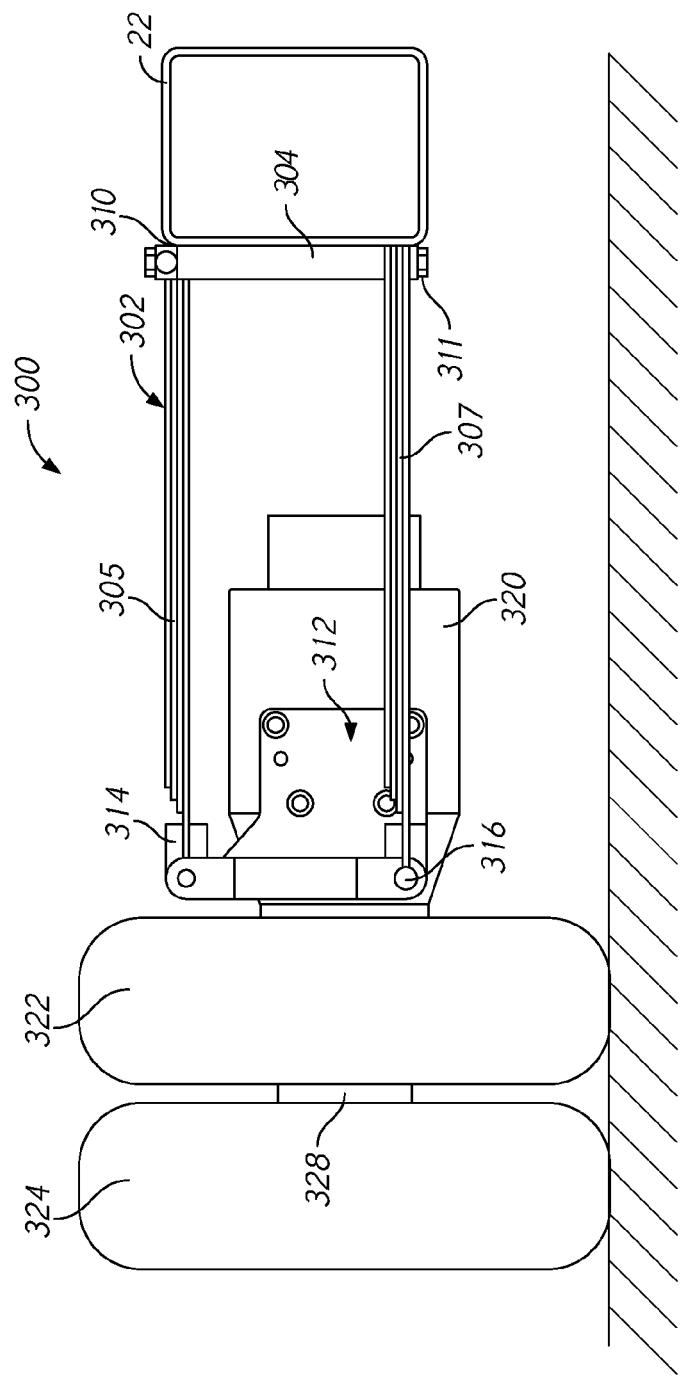
FIG. 29 is a front view of the left side wheel unit shown in FIG. 28, with the wheels of the unit on the ground in an in-use position.

FIG. 29 shows the wheel unit 300 as installed and in use. The wheel unit 300 includes a suspension assembly 302 supporting a motor housing 320 containing an electric drive motor driving an axle 328 through a gear reduction unit. An inner wheel 322 and an outer wheel 324 are attached to the axle 328. The motor housing 320, electric motor, gear reduction unit and axle 328 may be the same as those described above relative to FIGS. 5A and 5B. Accordingly, the six sets of wheels shown in FIG. 28 may have the same design. The front, center and rear sets of wheels shown in FIG. 28 may also be aligned with each other in the front-to-back direction. For mobile bases having three wheels in each wheel set, as shown in FIG. 5B, the wheels on the wheel unit 300 may align with the outer and center wheels of the three-wheel set. The motor in the wheel unit 300 is connected via a cable to the electrical system of the mobile base, in the same way as the motors at the front and back of the chassis. A single controller, such as a joystick, may then be used by the operator to cause all six motors to drive the mobile base forwardly or rearwardly, and also cause the front and/or rear wheels to also steer.

Figure 32:
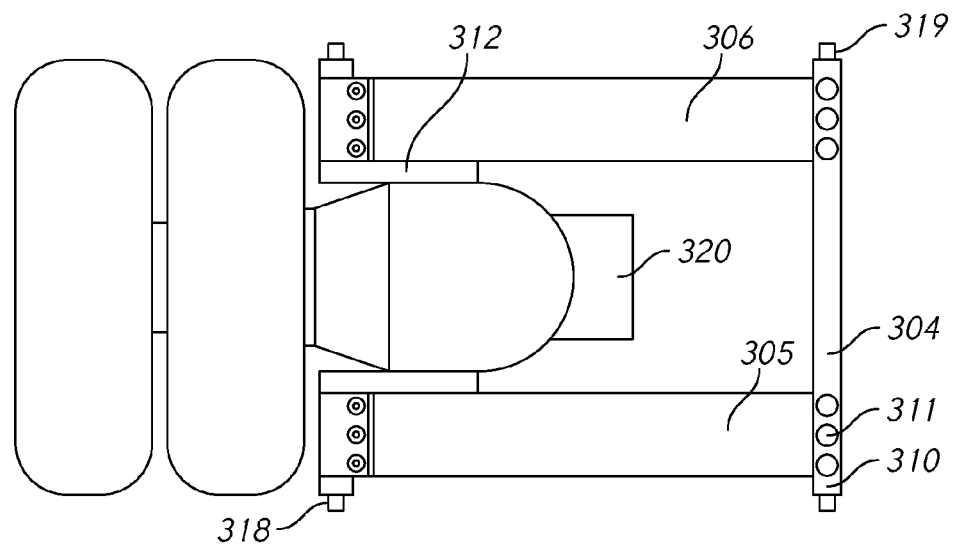
FIG. 32 is a top view of the driving wheel unit shown in FIG. 31.

Referring back to FIG. 29, the suspension assembly 302 may include a inner plate 304 which can be bolted onto the chassis using the bolt holes 170 shown in FIG. 2. As shown in FIGS. 29 and 32, the inner ends of four sets of leaf springs are attached to the inner plate 304. The front upper leaf springs 305 and the front lower leaf springs 307 are shown in FIG. 29. The rear upper leaf springs 306 are shown in FIG. 32. The rear lower leaf springs are vertically aligned below the rear upper leaf springs 306, and horizontally aligned with the front lower leaf springs 307. Each of the leaf springs includes a stack of spring leaves.

Figure 31:
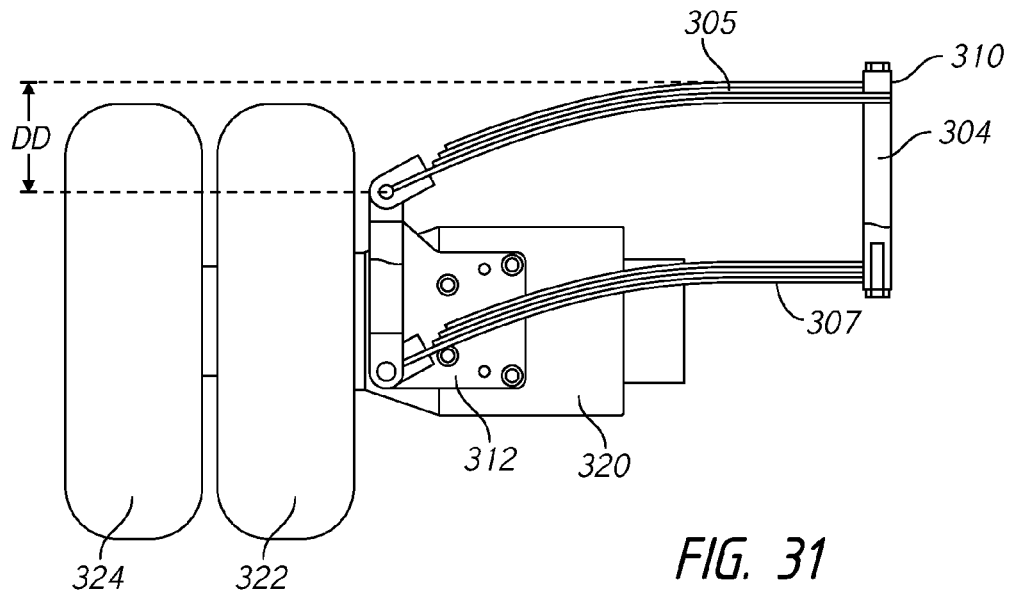
FIG. 31 is a reduced scale front view of the left side wheel unit shown in FIGS. 29 and 30 showing the position of the wheels when the mobile base of FIG. 28 is jacked up off of the ground.

Referring still to FIGS. 29 and 32, a flange 330 of the outer plate 312 is attached to the motor housing 320. A clevis 314 on the outer ends of each of the leaf springs is pivotally attached to the outer plate 312 via clevis pins 316. Turning momentarily to FIGS. 34-37, a clevis plate 338 is bolted onto the motor plate 312. The clevis 314 of each of the leaf springs is positioned within a clevis slot 336 formed between the clevis plate 338 and an inner clevis arm 332 of the outer plate 312. The clevis pin 316 extends through the clevis and through holes in the clevis plate 338 and the inner clevis arm, to pivotally attach the outer end of each of the leaf springs to the outer plate 312. The outer plate 312 may be a single plate, or two separate plates, with the separate outer plates attached to opposite sides of the motor housing 320. The outer plate 312 may alternatively be included or integral with the motor housing 320. Indeed, both the chassis or inner plate 304 and the outer plate 312 may be designed in various forms, as they need only provide rigid end links of the suspension assembly 302. Consequently, they may optionally also be provided as bars or tubes, rather than a plate. As used here, inner plate and outer plate include these alternative structures:

As shown in FIG. 31, the leaf springs have a downward curvature when not loaded, for example before the wheel units are installed on the chassis 22, or after they are installed but with the chassis 22 jacked up off of the ground. FIG. 31 shows a downward curvature or displacement DD of the leaf springs of about 2 to 5 or 6 inches. The displacement DD, which is the dimension between the unloaded position of the wheels as shown in FIG. 31, and the level or horizontal loaded position of the wheels as shown in FIG. 29, may vary depending on the spring constant of the leaf springs and the intended load to be carrier by the wheels 322 and 324.

The leaf springs may be designed so that with the wheel units loaded as shown in FIG. 29, each of the wheels of the six wheels sets shown in FIG. 28 carriers substantially the same load. For example, with a mobile base 20 weighing 7500 pounds and having a total of 12 wheels, the leaf springs may be designed to nominally load each wheel of with 625 pounds. The load carried by each wheel unit (having two wheels) is then 1250 pounds, and the left and right side wheel units together carry 2500 pounds, with the front and rear wheels each also carrying 2500 pounds.

Figure 30:
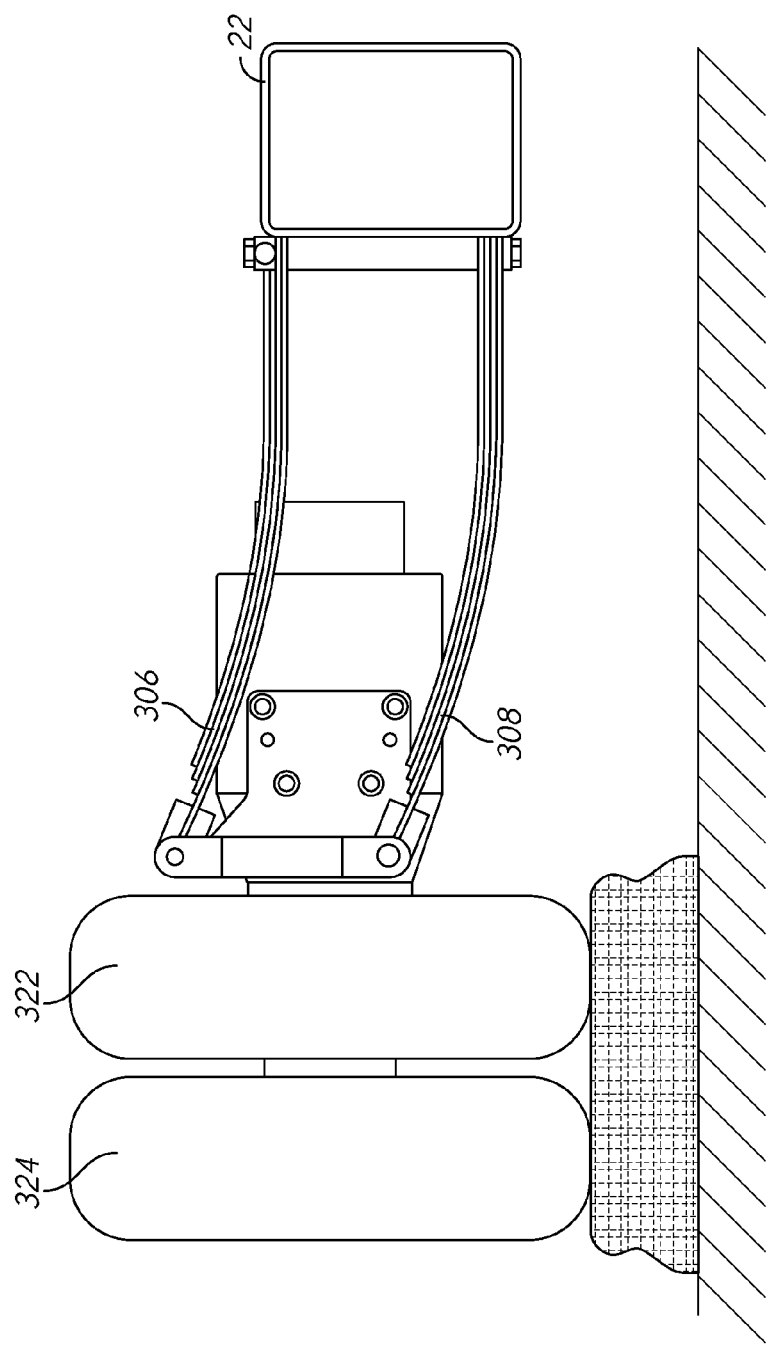
FIG. 30 is a front view of the left side wheel unit shown in FIG. 29 with the wheels on the unit shown rolling over a bump or obstacle on the ground.

As shown in FIG. 30, the suspension assembly 302 of the wheel units 300 allow the wheels to deflect upwardly when the wheels roll over a bump or obstacle. This movement helps to keep the mobile base level, as the leaf springs flex upwardly, rather than lifting the chassis upwardly. Since the wheels 322 and 324 are mounted on the suspension assembly 302, the load on the wheels depends entirely on the design or the suspension assembly, and is independent of the weight of the mobile base 300, or any payload placed on the mobile base 300. As the wheels deflect upwardly as shown in FIG. 30, the load on the wheels temporarily increases proportional to the spring constant of the leaf springs and the amount of upward deflection. The load on the wheels returns to a nominal value after the wheels pass over the bump and return to level ground as shown in FIG. 29.

Due to the downward curvature of the springs as shown in FIG. 31, the wheel unit 300 cannot be attached to the chassis 22 unless the chassis is lifted up several inches, or unless the wheels 322 and 324 can be temporarily positioning below ground level. The chassis 22 may be lifted by driving it up onto a ramps, either one side at a time using two ramps (one ramp at the left front wheels and one ramp at the left back wheels), or using four ramps (with one ramp at the wheel set at each of the four corners of the chassis). The chassis 22 may also be lifted by jacking. However, these procedures require ramps, or a jack, and can be time consuming.

Figure 33:
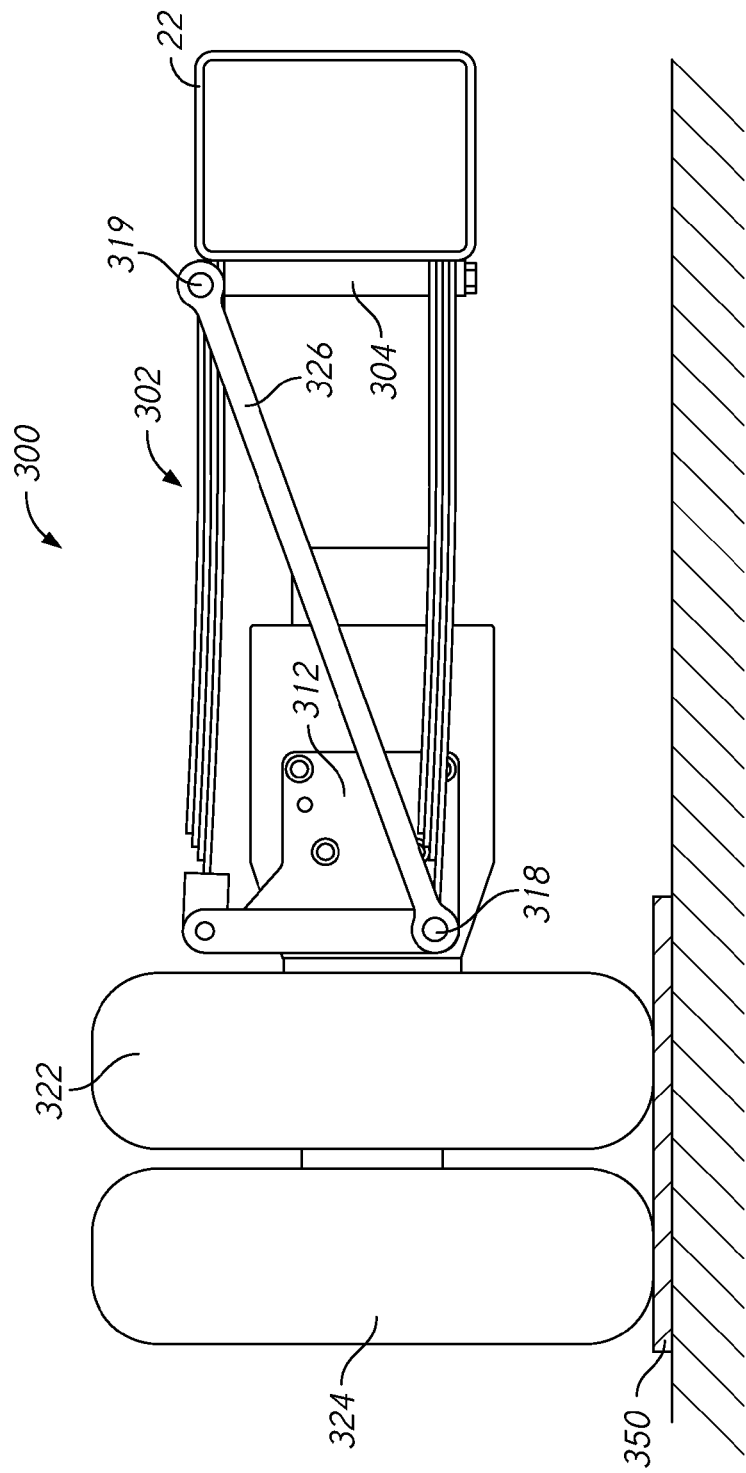
FIG. 33 is a front view of the left side wheel unit shown in FIGS. 29-32 with a holding strut installed.

As shown in FIG. 33, the wheel unit 300 may be designed to allow for installation without jacking the chassis, using ramps, or positioning the wheels below ground level. As shown in FIG. 33, the suspension assembly 302 of the wheel unit 300 may be provided in a level condition, with the springs substantially straight, via use of a holding link 326. The outer end of the link 326 is placed over or around an outer end pin 318 on the outer plate 312. The inner end of the link 3256 is placed over or around an inner end pin 318 on the inner plate 304. FIG. 33 shows a link 326 on the front of the wheel unit 300. A second mirror image link 326 may similarly be placed on the back of the wheel unit 300. Using two links provides for symmetrical loading and avoids twisting forces on the suspension assembly 302.

The link or links 326 hold the wheel unit into the level position shown in FIGS. 29 and 33. The wheel unit 300 can then be bolted, or otherwise attached, onto the chassis, while the chassis is supported on the ground by the front and back wheels. After the wheel unit 300 is installed, the mobile base 20 is driven forward to roll the wheels 322 and 324 up onto a shim or block 350. This causes the suspension assembly 302 to deflect upwardly, taking the load off of the links 326. The links 326 are then removed, the mobile base is moved off of the shim 350 and is ready for use with the wheel units installed. Since the links 326 nominally hold the suspension assembly 302 in a horizontal or level position, e.g., with the axle 90 at a nominal midpoint, a shim 350 having a thickness or height of 0.2 to 0.8 or 0.4 to 0.6 inches, is sufficient to allow the links 326 to be unloaded and released. The wheel units 300 may be removed by following the reverse sequence of steps. The links 326 may be stored on the mobile base 20 when not in use.

Unlike the front and rear wheel sets, the wheels 322 and 324 of the wheel unit 300 may be designed so that they are fixed in a straight ahead position and do not steer. If the wheels 322 and 324 are at the front/back center of the chassis, they will track the path of the mobile base 20 in round and corrective steering modes, without substantial scrubbing or skidding. The maximum steering angle of the "front" or steering wheels in corrective steering mode may be limited to correspondingly limit the steering angle difference between the front wheels and the wheels 322 and 324 of the wheel units 300. Limiting the maximum steering angle may be achieved by placing a hard stop, such as a pin, in the steering transmission 120, to limit the movement of the steering arms or compensator plates shown in FIG. 10-16.

Use of the wheel units 300 on the mobile base of FIG. 28 can provide a 50% increase in driving power and traction in comparison the mobile base shown in FIGS. 1-4. Since the wheels 322 and 324 are spring loaded, then are in constant contact with the ground, regardless of irregular movement of the chassis. The wheels 322 and 324 of the wheel unit 300 also help to stabilize the base against tipping forces, for example when a crane arm is extended off to one side of the mobile base. Use of the wheel units also distributes the weight of the mobile base over 12 wheels instead of the 8 wheels shown in FIGS. 1-4. This reduces the ground pressure exerted by the wheels and allows for better mobility on soft surfaces such as grass, soil or sand.

Thus, a novel camera crane mobile base has been shown and described. Many changes and substitutions may of course be made without departing from the spirit and scope of the invention. The invention, therefore, should not be limited, except by the following claims and their equivalents.

The invention claimed is:

1. A camera crane mobile base, comprising:
   a chassis;
   a front left drive motor assembly, a front right drive motor assembly, a rear left drive motor assembly, and a rear right drive motor assembly, on the chassis, each including an electric motor linked to an axle via a gear reduction and at least one wheel on the axle;
   a middle left drive motor assembly and a middle right drive motor assembly, each including an electric motor linked to a middle axle via a gear reduction and at least one wheel on the middle axle, and a spring suspension assembly attached to the chassis and supporting the middle axle, with the spring suspension assembly comprising a chassis plate attachable to the chassis, an outer plate attached to the motor, an upper spring having an inner end attached to the chassis plate and an outer end pivotally attached to the outer plate, and an lower spring having an inner end attached to the chassis plate and an outer end pivotally attached to the outer plate; and
   an electrical power supply on the chassis linked to each of the electric motors.

2. The camera crane mobile base of claim 1 with the middle left and right drive motor assemblies attached adjacent to center of the chassis.

3. The camera crane mobile base of claim 1 with the upper and lower springs comprising leaf springs, and with the inner ends of the upper and lower springs rigidly attached to the chassis plate.

4. The camera crane mobile base of claim 1 with the spring suspension assembly pre-loaded to exert a downward force on the middle axle.

5. The camera crane mobile base of claim 1 with the spring suspension further comprising an outer pin and an inner pin, and a diagonal holder link attached to the outer pin and the inner pin, with the holder link holding the spring suspension with the upper and lower springs parallel to each other.

6. The camera crane mobile base of claim 1 with the spring suspension comprising upper and lower springs each having inner ends rigidly attached to a chassis plate and outer ends pivotally attached to an outer plate.

7. The camera crane mobile base of claim 1 with the upper spring comprising an upper front spring and the lower spring comprising a lower front spring, and further comprising an upper rear spring having an inner end attached to the chassis plate and an outer end pivotally attached to the outer plate, and an lower rear spring having an inner end attached to the chassis plate and an outer end pivotally attached to the outer plate.

8. A camera crane mobile base drive wheel accessory, comprising:
- an inner plate attachable to a chassis of a camera crane mobile base;
- an upper spring and a lower spring each having an first end rigidly attached to the inner plate, and an outer end pivotally attached to an outer plate, with the inner and outer plates and the upper and lower springs forming a parallelogram, and an axle supported by the outer plate and movable from a first position wherein the upper and lower springs are curved and no load is applied to the springs, to a second position wherein the upper and lower springs are straight and parallel, and load is applied to the springs; and
- a motor housing attached to the outer plate and containing an electric motor linked to the axle via a gear reduction and at least one wheel on the axle.

9. The camera crane mobile base drive wheel accessory of claim 8 with the upper and lower springs parallel to each other when the accessory is attached to chassis of a camera crane mobile base on flat ground.

10. The camera crane mobile base drive wheel accessory of claim 8 wherein the distance between the first position and the second position is from 2 to 5 inches.

11. The camera crane mobile base drive wheel accessory of claim 8 with the load required to move the axle from the first position to the second position ranging from 800 to 2000 pounds.

12. A camera crane mobile base, comprising:
- a chassis;
- a front left drive motor assembly, a font right drive motor assembly, a rear left drive motor assembly, and a rear right drive motor assembly, each on the chassis and including an electric motor linked to an axle;
- at least one wheel on each axle not suspended from the chassis;
- a middle left drive motor assembly and a middle right drive motor assembly, each including an electric motor linked to a middle axle with at least one wheel on each middle axle, and a spring suspension assembly attached to the chassis and supporting each middle axle, with the spring suspension curved down when unloaded.

* * * * *